United States Patent
Das

(10) Patent No.: US 11,823,589 B2
(45) Date of Patent: Nov. 21, 2023

(54) INTERACTIVE DEVICE-BASED TEACHING OF LANGUAGE

(71) Applicant: International Business Machines Corporation, Armonk, NY (US)

(72) Inventor: Rajarshi Das, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 16/524,231

(22) Filed: Jul. 29, 2019

(65) Prior Publication Data

US 2021/0035468 A1 Feb. 4, 2021

(51) Int. Cl.
*G09B 19/04* (2006.01)
*G09B 7/04* (2006.01)
*G06N 5/04* (2023.01)
*G06N 20/00* (2019.01)
*G09B 19/06* (2006.01)
*G09B 5/04* (2006.01)

(52) U.S. Cl.
CPC ............... *G09B 19/04* (2013.01); *G06N 5/04* (2013.01); *G06N 20/00* (2019.01); *G09B 7/04* (2013.01); *G09B 19/06* (2013.01); *G09B 5/04* (2013.01)

(58) Field of Classification Search
CPC ........ G09B 19/04; G09B 17/04; G09B 19/06; G09B 5/04; G06N 20/00; G06N 5/04
See application file for complete search history.

(56) References Cited

U.S. PATENT DOCUMENTS

| | | | | |
|---|---|---|---|---|
| 5,429,513 A | * | 7/1995 | Diaz-Plaza | G09B 5/062 434/167 |
| 5,511,980 A | | 4/1996 | Wood | |
| 5,730,602 A | * | 3/1998 | Gierhart | G09B 11/00 434/362 |
| 6,802,717 B2 | * | 10/2004 | Castro | G09B 11/00 345/173 |
| 8,777,626 B2 | | 7/2014 | Levy | |
| 2003/0134257 A1 | * | 7/2003 | Morsy | G09B 7/00 434/362 |
| 2003/0162162 A1 | * | 8/2003 | Marggraff | G09B 7/00 434/410 |
| 2003/0228559 A1 | | 12/2003 | Hajjar | |
| 2009/0068625 A1 | * | 3/2009 | Petro | G09B 1/00 434/167 |

(Continued)

OTHER PUBLICATIONS

P. Mell, et al. "*The NIST Definition of Cloud Computing*", NIST Special Publication 800-145, Sep. 2011, Gaithersburg, MD.

*Primary Examiner* — Steve Rowland
(74) *Attorney, Agent, or Firm* — Joseph P. Curcuru; George S. Blasiak; Heslin Rothenberg Farley & Mesiti P.C.

(57) ABSTRACT

Methods, computer program products, and systems are presented. The method, computer program products, and systems can include, for instance: providing to a student user prompting data, wherein the prompting data prompts the student user to enter into an electronic teaching device voice data defining a correct pronunciation for a certain alphabet letter of a language alphabet, and wherein the prompting data prompts the student user to electronically enter handwritten data into the electronic teaching device defining a correct drawing of the certain alphabet letter; and examining response data received from the student user in response to the prompting data.

20 Claims, 18 Drawing Sheets

(56) References Cited

U.S. PATENT DOCUMENTS

| | | | |
|---|---|---|---|
| 2009/0174142 A1* | 7/2009 | Sullivan | A63F 3/0423 |
| | | | 273/272 |
| 2014/0093846 A1* | 4/2014 | Bird | A63F 3/00529 |
| | | | 434/167 |
| 2014/0234809 A1* | 8/2014 | Colvard | G09B 17/006 |
| | | | 434/169 |
| 2014/0272823 A1* | 9/2014 | Christian | G09B 19/00 |
| | | | 434/169 |
| 2016/0071427 A1* | 3/2016 | Davis | G09B 11/04 |
| | | | 434/162 |
| 2016/0111016 A1* | 4/2016 | Govindaraj | G09B 19/00 |
| | | | 434/156 |
| 2017/0148341 A1* | 5/2017 | Boulton | G06F 40/126 |
| 2017/0330479 A1* | 11/2017 | Bowman | G09B 19/04 |
| 2018/0151087 A1 | 5/2018 | Wise | |
| 2020/0027368 A1* | 1/2020 | Butler | G09B 17/006 |
| 2020/0228638 A1* | 7/2020 | Ghassabian | G06F 1/1684 |

\* cited by examiner

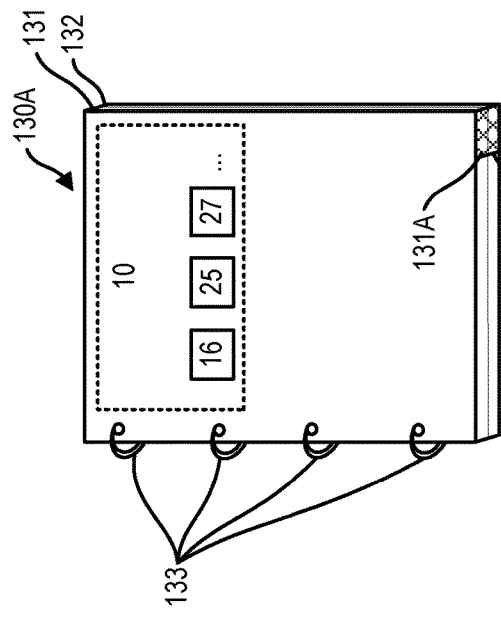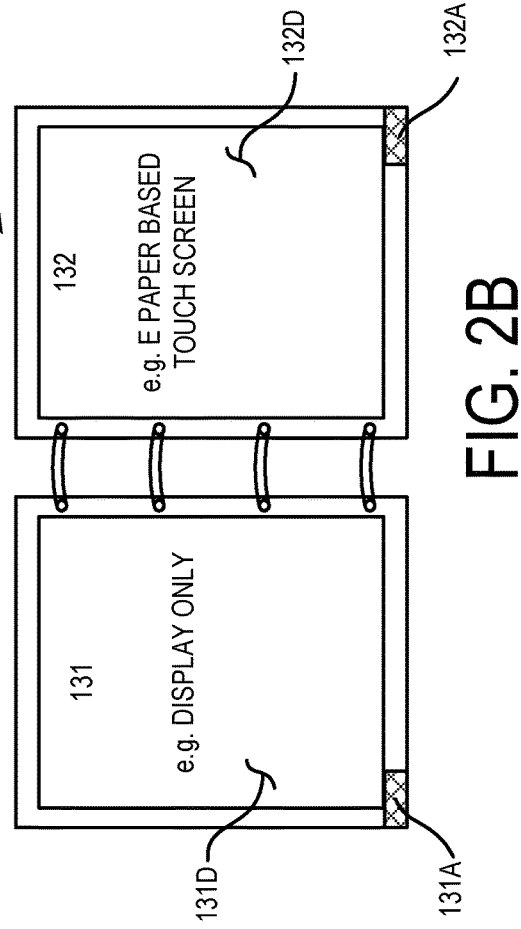

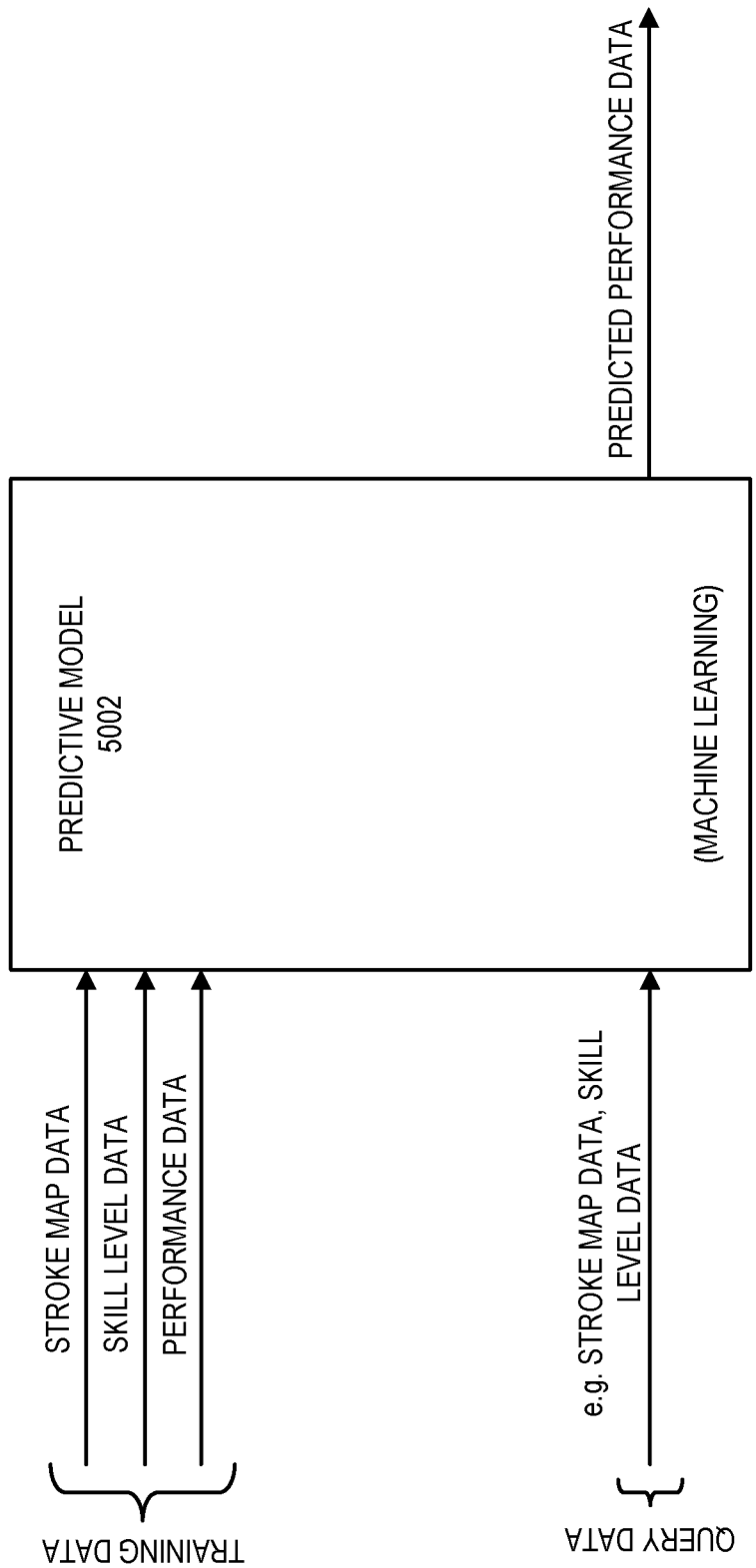

INTERACTIVE DEVICE-BASED TEACHING OF LANGUAGE

BACKGROUND

Artificial intelligence (AI) refers to cognitive intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: providing to a student user prompting data, wherein the prompting data prompts the student user to enter into an electronic teaching device voice data defining a correct pronunciation for a certain alphabet letter of a language alphabet, and wherein the prompting data prompts the student user to electronically enter handwritten data into the electronic teaching device defining a correct drawing of the certain alphabet letter; examining response data received from the student user in response to the prompting data; and based on the examining indicating that the student user has correctly pronounced and drawn the certain alphabet letter, providing to the student user next prompting data, wherein the next prompting data prompts the student user to correctly pronounce a next alphabet letter, wherein the next prompting data prompts the student user to correctly draw the next alphabet letter, the next alphabet letter being successive to the certain alphabet letter in the language alphabet.

In another aspect, a computer program product can be provided. The computer program product can include a computer readable storage medium readable by one or more processing circuit and storing instructions for execution by one or more processor for performing a method. The method can include, for example: providing to a student user prompting data, wherein the prompting data prompts the student user to enter into an electronic teaching device voice data defining a correct pronunciation for a certain alphabet letter of a language alphabet, and wherein the prompting data prompts the student user to electronically enter handwritten data into the electronic teaching device defining a correct drawing of the certain alphabet letter; examining response data received from the student user in response to the prompting data; and based on the examining indicating that the student user has correctly pronounced and drawn the certain alphabet letter, providing to the student user next prompting data, wherein the next prompting data prompts the student user to correctly pronounce a next alphabet letter, wherein the next prompting data prompts the student user to correctly draw the next alphabet letter, the next alphabet letter being successive to the certain alphabet letter in the language alphabet.

In a further aspect, a system can be provided. The system can include, for example a memory. In addition, the system can include one or more processor in communication with the memory. Further, the system can include program instructions executable by the one or more processor via the memory to perform a method. The method can include, for example: providing to a student user prompting data, wherein the prompting data prompts the student user to enter into an electronic teaching device voice data defining a correct pronunciation for a certain alphabet letter of a language alphabet, and wherein the prompting data prompts the student user to electronically enter handwritten data into the electronic teaching device defining a correct drawing of the certain alphabet letter; examining response data received from the student user in response to the prompting data; and based on the examining indicating that the student user has correctly pronounced and drawn the certain alphabet letter, providing to the student user next prompting data, wherein the next prompting data prompts the student user to correctly pronounce a next alphabet letter, wherein the next prompting data prompts the student user to correctly draw the next alphabet letter, the next alphabet letter being successive to the certain alphabet letter in the language alphabet.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 2A-2B depict a physical form view of electronic teaching device according to one embodiment;

FIGS. 5A and 5B depict predictive models trained by machine learning processes according to one embodiment;

DETAILED DESCRIPTION

Figure 1:
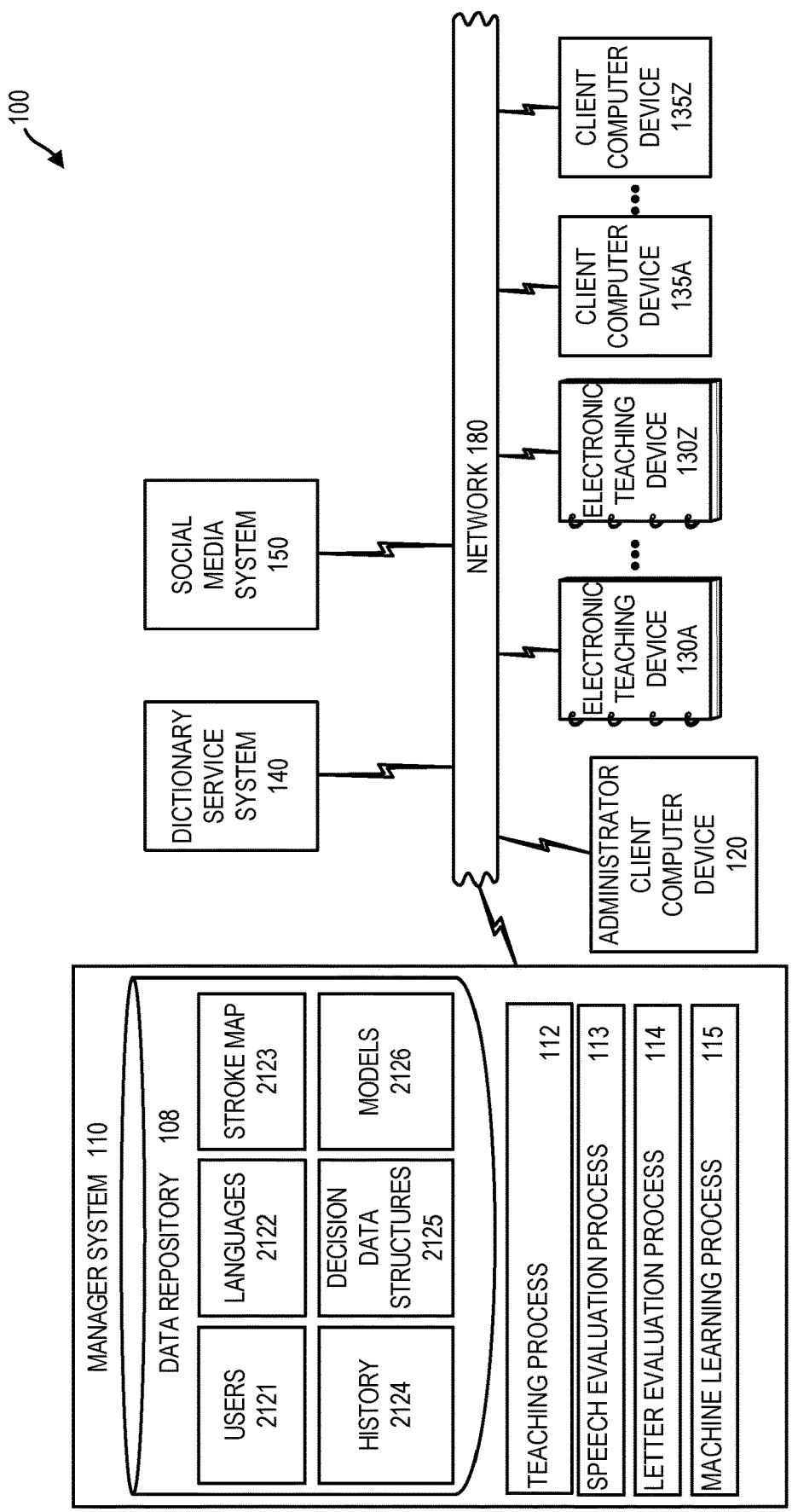
FIG. 1 depicts a system having a manager system, an administrator client computer device, electronic teaching devices, client computer devices, a dictionary service system, and a social media system according to one embodiment.

System 100 for use in teaching students in respect to spoken and written alphabet letters is shown in FIG. 1. System 100 can include manager system 110 having an associated data repository 108, administrator client computer device 120, electronic teaching devices 130A-130Z, dictionary service system 140, and social media system 150.

Manager system 110, administrator client computer device 120, electronic teaching devices 130A-130Z, dictionary service system 140, and social media system 150 can be in communication with one another via a network 180.

Manager system 110, administrator client computer device 120, electronic teaching devices 130A-130Z, dictionary service system 140, and social media system 150 can be provided by computing node based systems and devices connected by network 180. Network 180 can be a physical network and/or a virtual network. A physical network can be for example a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

In one embodiment, manager system 110 can be external to administrator client computer device 120, electronic teaching devices 130A-130Z, dictionary service system 140, and social media system 150. In another embodiment, manager system 110 can be collocated with one or more of administrator client computer device 120, electronic teaching devices 130A-130Z, dictionary service system 140, and/or social media system 150.

Each of the different electronic teaching devices 130A-130Z can be associated to a different user. Electronic teaching devices according to one embodiment can be a computing node device having a specialized form factor an example of which is described in FIGS. 2A and 2B. Regarding one or more client computer device 130A-130Z, a computer device of one or more client computer device 130A-130Z in one embodiment can be a computing node device provided by a client computer, e.g. a mobile device, e.g. a smartphone or tablet, a laptop, smartwatch or PC that runs one or more program, e.g. including a web browser for opening and viewing web pages. Each of the different client computer devices 135A-135Z can be associated to a different user. Regarding one or more client computer device 135A-135Z, a computer device of one or more client computer device 135A-135Z in one embodiment can be a computing node device provided by a client computer, e.g. a mobile device, e.g. a smartphone or tablet, a laptop, smartwatch or PC that runs one or more program, e.g. including a web browser for opening and viewing web pages.

Social media system 150 can include a collection of files, including for example, HTML files, CSS files, image files, and JavaScript files. Social media system 150 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send with permission data defining the registration data a permission that grants access by manager system 110 to data of the user within social media system 140. On being registered, manager system 110 can examine data of social media system 150 e.g. to determine whether first and second users are in communication with one another via a messaging system of social media system 150. A user can enter registration data using a user interface displayed on a client computer device of electronic teaching devices 130-130Z or client computer devices 135A-135Z. Entered registration data can include e.g. name, address, social media account information, other contact information, biographical information, background information, preferences information, and/or permissions data e.g. can include permissions data allowing manager system 110 to query data of a social media account of a user provided by social media system 140 including messaging system data and any other data of the user. When a user opts-in to register into system 100 and grants system 100 permission to access data of social media system 150, system 100 can inform the user as to what data is collected and why, that any collected personal data may be encrypted, that the user can opt out at any time, and that if the user opts out, any personal data of the user is deleted.

Data repository 108 of manager system 110 can store various data. In users area 2121 data repository 108 can store data on users of system 100. On registration of a user into system 100 manager system 110 can assign a Universally Unique Identifier (UUID) to each new user. Along with the UUID for each user, there can be stored in users area 2121, e.g. the name of each user, friendly names for respective users, demographic data for respective users, contact data for respective users, and the like.

In languages area 2122 data repository 108 can store dictionary data for support of one or more language. System 100 can be configured to teach users in respect to spoken and written letters of one or more alphabet. System 100 can be configured so that system 100 teaches users in respect to one or more language. System 100 can be configured so that manager system 110 iteratively queries data from dictionary service system 140. Dictionary service system 140 can be configured to provide dictionary services in one or more language. Dictionary services can include services that provide data specifying proper pronunciation and annunciation of letters in different languages. Dictionary service system 140 can also provide data specifying the proper formation of alphabet letters in one or more language.

Data repository 108 in stroke map area 2123 can include data specifying a stroke sequence defining the proper formation of respective letters in one or more alphabet associated to one or more language. Manager system 110 can obtain data for storage into stroke map area 2123 from multiple sources. According to one embodiment, administrator client computer device 120 can display a user interface that allows an administrator to define stroke map data. A stroke map herein can refer to a sequence of strokes used to define an alphabet letter. For a respective letter, there can be more than one stroke map, each stroke map for a respective letter defining a different sequence of strokes. Embodiments herein recognize that there are multiple ways in which a given alphabet letter can be formed. For example, the English letter "A" can be formed with use of any one of the following possible stroke sequence that can be represented with stroke map data: 1. (strokemap1), (a) first stroke defining a left angled line from top center apex to lower left corner, (b) a second stroke defining a right angled line from a top center apex to lower right corner, (c) a third stroke defining a horizontal line extending left to right connecting the left angled line to the right angled line; 2. (strokemap2), (a) lower left corner to top center apex, (b) top apex to lower right corner, (c) horizontal line extending left to right connecting left angled line to right angled line, 3. (strokemap3), (a) horizontal line extending right to left, (b) right line extending from lower right corner to top apex and touching horizontal line, (c) left line extending from lower left corner to top center apex and touching left side of horizontal line. Embodiments herein recognize, based on the described example for the English alphabet letter "A", that multiple stroke maps can be provided for each respective alphabet letter.

The user interface for display on administrator client computer device 120 for use in defining stroke map data can present to administrator user prompting data that prompts the administrator user to input graphical data that defines stroke maps and which can permit the administrator user for respective letters, multiple stroke maps.

Manager system 110 can be configured to obtain stroke map data for populating stroke map area 2123 by use of alternative processes. For example, manager system 110 can be configured to iteratively query social media system 150 for input data that is input by users of social media system 150 with use of a user interface adapted for electronic input of handwritten data. According to one embodiment, manager system 110 for populating data of stroke map area 2123 can examine electronically input handwritten letters entered by users of electronic teaching devices 130A-130Z and/or client computer devices 135A-135Z, e.g. when such users are engaging in conversations mediated by social media system 150. Electronic teaching devices 130A-130Z and/or client computer devices of client computer devices 135A-135Z can have, e.g. a touchpad for input of handwritten data and manager system 110 can monitor and examine such handwritten data to learn stroke sequences in popular use by a population for defining of alphabet letters. Manager system 110 can be configured to iteratively query electronically input handwritten data received from electronic teaching devices 130A-130Z and/or client computer devices 135A-135Z to learn stroke sequences in popular use by users of system 100 and when learning a new stroke sequence, manager system 110 can register a newly identified stroke sequence as a stroke map for a given letter for storage into stroke map area 2123. Social media data, according to one example, can include electronically input handwritten data which can be examined by manager system 110 to determine stroke maps for storage into stroke map area 2123 as set forth herein.

Stroke map area 2123 for a respective letter of an alphabet of a certain language can store one or more stroke map. According to one use case, each stroke map for a given letter can be provided as a candidate stroke map for deployment in a teaching run mode of operation.

Users of system 100 can include, e.g. student users and guardian users, which guardian users can be associated to student users. According to one use case, student users of system 100 can be children or other student users seeking improvement in language skills. A guardian user can be associated to a student user. Registration of a user, according to one scenario, more than one user can be registered. For example, when student user registration data, guardian user data can contemporaneously be obtained by manager system 110 for storage into users area 2121. Data stored in users area 2121 can include registration data such as, contact data, name data, preferences data, and permissions data. One example of permissions data can include permissions specifying that manager system 110 is permitted to examine social media data of a registered user.

Data repository 108 in history area 2124 can store historical data that records data of actions by users in use of system 100. For example, instances or run modes of operation of system 100 can be specified as teaching sessions of system 100, in which system 100 is used for teaching a student. History data of history area 2124 can be organized into teaching sessions referenced to respective users. For example, a respective teaching session can have an associated user and can be assigned a UUID specific to the teaching session. Historical teaching session data can include, e.g. data specifying a success or failure of a student user in response to a challenge presented by manager system 110 and include granular data such as high resolution voice clips received from a user in response to a pronunciation challenge presented by manager system 110 and can include handwritten data entered by a user in response to a letter formation challenge presented to a user by manager system 110.

Data repository 108 in decision data structures area 2125 can store decision data structures, e.g. decision tables, decision trees for return of action decisions for use in teaching one or more student. Data repository 108 in models area 2126 can store one or more predictive model that can be trained with use of machine learning training. The predictive model stored in models area 2126 can include for example a predictive model that predicts that best performing stroke map for use in teaching a student user.

Manager system 110 can run various processes. Manager system 110 running teaching process 112 can include manager system 110 presenting a user with a test which can comprise a sequence of challenges defined by prompting data. A sequence of challenges can include for a given alphabet letter (a) a letter pronunciation challenge; (b) a handwritten letter formation challenge; and (c) a combined pronunciation and handwritten letter formation challenge. Manager system 110 running teaching process 112 can include manager system 110 deploying the sequence of challenges (a), (b), and (c) referenced herein for an ordered sequence of alphabet letters starting with a first letter of an alphabet. For example, for the English language, the sequence of challenges (a), (b) and (c) can initially be deployed to a user for the initial alphabet letter "A" and can then proceed to the alphabet letter "B", and then to "C", and so on. Manager system 110 running teaching process 112 can include manager system 110 running associated supporting processes such as speech evaluation process 113 and letter evaluation process 114.

Manager system 110 running speech evaluation process 113 can use data from languages area 2122 of data repository 108. Manager system 110 running speech evaluation process 113 can examine input voice data input by a student user in reference to reference data which references a proper pronunciation for an alphabet letter. According to one example, manager system 110 running speech evaluation process 113 can examine voice data input by a student user in reference to pronunciation reference data for the letter stored in languages area 2122 to return a similarity score for the user input voice data. Where manager system 110 determines that a score for input voice data of a student user exceeds a threshold, manager system 110 can return a determination that the user has properly pronounced a letter for which manager system 110 has challenged a user to enter a proper pronunciation.

Manager system 110 running letter evaluation process 114 can examine electronically input handwritten data of a student user in reference to stroke map data stored for a certain letter in stroke map area 2123. Manager system 110 running letter evaluation process 114 can score electronically input handwritten data input by a student user using an electronic teaching device of electronic teaching devices 130A-130Z to return the similarity score, the input handwritten data as compared to stroked map data for a certain user. Manager system 110 in response to a determination that a returned similarity score has exceeded a threshold can determine that a user has properly entered electronic handwritten data to properly draw the alphabet letter having an associated stroke map data stored in stroke map area 2123.

Manager system 110 running machine learning process 115 can include manager system 110 training one or more predictive model such as a predictive model for predicting a best performing stroke map for use in teaching a student user. For example, embodiments herein recognize that a respective alphabet letter can have multiple associated candidate stroke maps for deployment which can define candidate stroke maps for deployment in a teaching session. The different stroke maps can respectively represent different stroke sequences that can conceivably be used for the formation of an alphabet letter. Over time, system 100 can be configured to deploy for a given letter, multiple different stroke maps and can apply teaching session data as training data for training a predictive model to predict a best performing stroke map for a given student user. Such a predictive model, once trained, can be responsive to query data. Query data can include, e.g. skill level of a user. The skill level of a respective user of system 100 can be iteratively updated over time based on response data of a user received in response to challenges presented by manager system 110 during teaching sessions. Query data can include, e.g. skill level of a user together with an identifier of a candidate stroke map. Predictive model 5002 can return predicted performance data based on the skill level and stroke map identifier. Manager system 110 can apply several sets of query data comprising skill level data and stroke map identifier data and can select the stroke map associated to the best predicted performance.

Electronic teaching devices 130A-130Z can be configured as set forth in FIGS. 2A-2B, details of a physical configuration of electronic teaching device 130A are shown and described. Referring to FIGS. 2A and 2B, electronic teaching device 130A according to one embodiment can be configured as a bound book having a page 131 defined as a rigid flat panel, second page 132 also defined as a rigid flat panel, wherein the first page 131 and the second page 132 are bound by a binding 133 that binds the first page 131 to the second page 132. FIG. 2A illustrates electronic teaching device 130A in a closed configuration and FIG. 2B illustrates electronic teaching device 130A in an open configuration. Embodiments herein recognize that student users, such as children student users, can have a preference for physical books and thus the configuration as shown in FIGS. 2A-2B in physical book form would encourage engagement of a student user with electronic teaching device 130A.

Referring to FIG. 2A, electronic teaching device 130A can include one or more computing node 10 which is further described in connection with FIG. 6 herein. For example, electronic teaching device 130A can include computing node 10 distributed between first page 131 and second page 132. According to one embodiment, electronic teaching device 130A can include computing node 10 disposed in first page 131 and second computing node 10 disposed within second page 132 wherein each of the first page 131 and the second page 132 are provided by rigid panels. One or more computing node 10 of electronic teaching device 130A can include various devices such as one or more processor 16, one or more output device 25, and one or more sensor 27. The one or more output device 25 can include one or more display and/or one or more audio output device, e.g. speaker. The one or more input sensor 27 can include, e.g. one or more touch panel for input of handwritten data and/or one or more audio input device, e.g. speaker. According to one embodiment, one or more computing node 10 of electronic teaching device 130A can be provided by a RASPBERRY® PI® model computing node which is one form of a low power computing node that can advantageously provide connectivity in remote areas with reduced power consumption (RASPBERRY® and PI® are registered trademarks of the Raspberry Pi Foundation).

Referring to FIG. 2B, showing electronic teaching device 130A in open configuration additional features are described. First page 131 and second page 132 can each comprise respective displays which can comprise one respective displays 131D and 132D which are visible when electronic teaching device 130A is in an open configuration as specified in FIG. 2B. Respective displays 131D and 132D define instances of one or more output device 25 as shown in FIG. 2A. According to one embodiment, display 131D of left page 131 can be configured differently than display 132D of right page 132. The highlighted commercial environment of a computing node can run various different operating systems including, e.g. UBUNTU MATE®, SNAPPY UBUNTU CORE®, and WINDOWS 10 IoT CORE™. (UBUNTU MATE® and SNAPPY UBUNTU CORE® are registered trademarks of Canonical Ltd and WINDOWS 10 IoT CORE™ is a trademark of Microsoft, Inc.). The described computing node can be equipped with various interfaces for connectivity including, e.g. WIFI and Bluetooth.

With further reference to FIG. 2B, displays 131D and 132D can be configured differently. For example, display 131D can be configured as a display only display and display 132D can be configured as a display with an integrated touchscreen, therefore display 132D can define a combination of an output device 25 provided by a display and a sensor 27 (FIG. 2A) defined by a touchscreen overlay. According to one embodiment, display 132D can be provided by an electronic paper (e-paper) based touchscreen display. E-paper display can emulate the appearance of ordinary ink on paper and thus can be engaging to a user. Many e-paper technologies can hold static text and image indefinitely without electrical power input and thus e-paper displays can feature reduced power consumption. According to one embodiment, display 132D provided by an e-paper based touchscreen can include titanium dioxide particles dispersed in a hydrocarbon oil.

According to further aspects described with respect to FIGS. 2A and 2B, first page 131 and second page 132 defining electronic teaching device 130A can include respective magnets 131A disposed in first page 131 and second magnet 132A disposed in second page 132. The respective magnets 131A and 132A can be disposed so that the respective magnets oppose one another when electronic teaching device 130A is in a closed book configuration as described in connection with FIG. 2A. Magnets 131A and 132A respectively, can be permanent magnets or transient magnets which are magnetized on powerup of electronic teaching device 130A. Magnets 131A and 132A can be configured so that magnets 131A and 132A are attracted to one another so that second page 132 and first page 131 tend to be pulled together when first page 131 and second page 132 are moved into close proximity. The magnetic attracting force provided by magnets 131A and 132A can be modest so that the attracting holding force can be broken by the force provided by a student user such as a child and pulling first page 131 away from second page 132.

According to one embodiment, manager system 110 can be configured to sense changes in electrical communication between magnets 131A and 132A, which communication changes can be in dependence on the spacing between first page 131 and second page 132. Accordingly, manager system 110 by monitoring of electrical communication between magnets 131A and 132A can determine whether electronic teaching device 130A is in open configuration (FIG. 2B) or in open configuration (FIG. 2A). According to one embodiment, manager system 110 can be configured to initiate a teaching session in response to the determination that a student user has opened electronic teaching device 130A to define the open configuration as depicted in FIG. 2B.

Figure 3A:
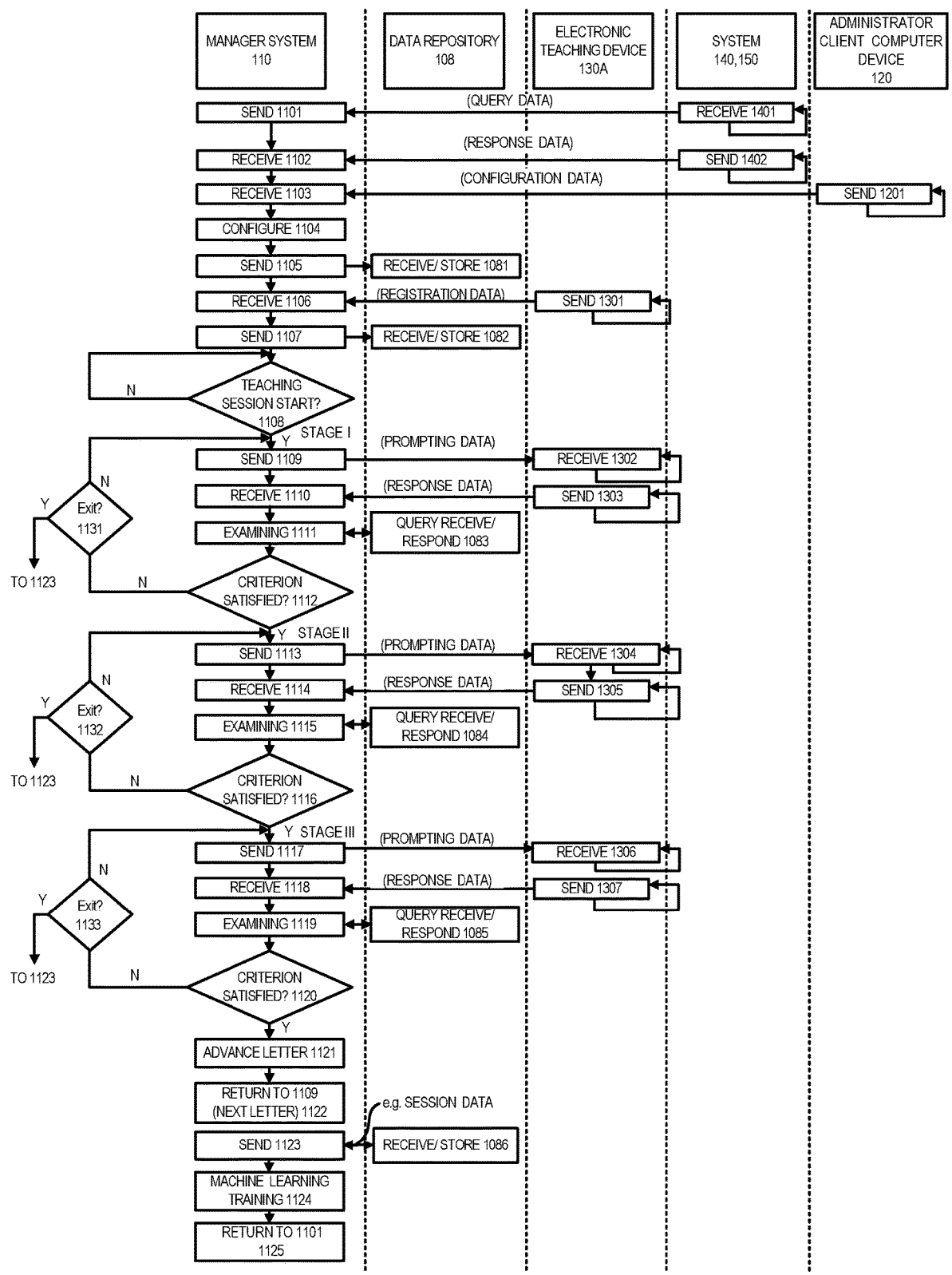
FIG. 3A is a flowchart illustrating a method for performance by a manager system interoperating with other components according to one embodiment.

FIG. 3A depict a flowchart illustrating a method for performance by manager system 110 interoperating with electronic teaching device 130A, systems 140 and 150, and administrator client computer device 120. Manager system 110 at block 1101 can be sending query data to systems 140 and 150 for receipt by systems 140 and 150 at block 1401. In response to the receipt of query data at block 1401, systems 140 and 150 at block 1402 can send response data to manager system 110 for receipt by manager system 110 at block 1102.

With reference to FIG. 1, manager system 110 at block 1101 can be querying dictionary service system 140, e.g. for updates on attribute data for one or more language supported by system 100 and can be sending query data to social media system 150, e.g. for samples of electronically input handwritten data for use by manager system 110, e.g. in populating stroke map area 2123 of data repository 108. At block 1201, administrator client computer device 120 can be sending configuration data for receipt by manager system 110 at block 1103. Configuration data sent at block 1201 can be configuration data defined by an administrator user using administrator user interface 3002, an example of which is shown in FIG. 3C.

Figure 3C:
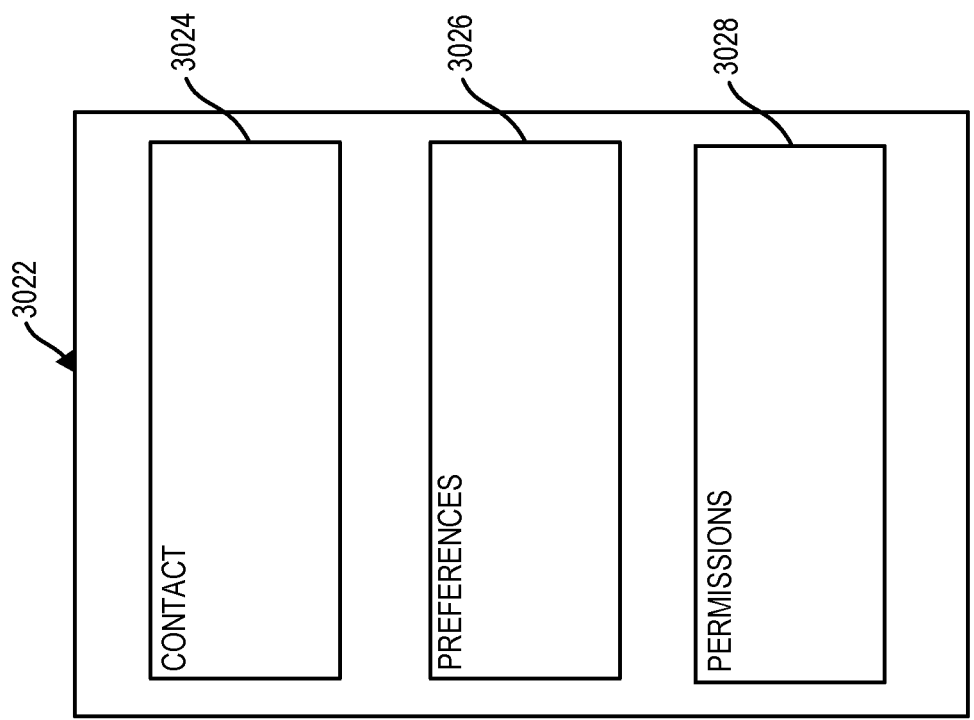
FIG. 3C depicts a user interface for display on a display of an electronic teaching device or a user client computer device according to one embodiment.

User interface 3002 as shown in FIG. 3C can be a displayed user interface for display on a display of an administrator client computer device 120. In stroke map area 3004 of user interface 3002, an administrator user can define data for populating stroke map area 2123 of data repository 108. Using area 3004, an administrator user can specify an alphabet letter of a supported language and can specify a sequence of strokes for formulation of an alphabet letter. User interface 3002 can be a graphical user interface (GUI) that provides graphical prompts to a user that prompts an administrator user to enter, e.g. with a stylus or finger a sequence of strokes, e.g. line segment strokes that define an alphabet letter. For example, for the letter "A" in the English language, a sequence of strokes defining the letter "A" can include (a) from top center apex to lower left corner, (b) from top center apex to lower right corner, and (c) a center horizontal line connecting the respective lines formed by (a) and (b). An administrator user can define more than one stroke map for each letter of a supported language. In voice clips area 3006, an administrator user can enter voice clips for various purposes. For example, some voice clips can be entered to define a proper pronunciation of an alphabet letter, which data also or alternatively can be obtained from dictionary service system 140. In settings area 3008 an administrator user can define settings for a teaching session. The settings can include settings determining, e.g. process flow, wait times, delay times, prompting data, e.g. positive and negating prompting data, e.g. positive prompting data for presentment in the case that a user answers correctly to a challenge of negative prompting data defining a response in the case a user responds incorrectly to a challenge and the like.

Manager system 110 in response to the receipt of administrator user defined configuration data received at block 1103 can proceed to block 1104. At block 1104 manager system 110 can determine if any usable data has been received at block 1102 or block 1103 and can determine whether a teaching session should be reconfigured based on the received response data received at block 1102 and block 1103. In response to a determination that there should be a reconfiguration of a teaching sessions manager system 110 can reconfigure a teaching session at block 1104 based on the received response data at block 1102 and/or the received configuration data received at block 1103.

At block 1105, manager system 110 can send various data for receipt and storage by data repository 108 at block 1081. The data sent for storage at block 1105 by manager system 110 can include, e.g. the raw response data received at block 1102 for population, e.g. of languages area 2122 and/or stroke map area 2123 and the raw configuration data received at block 1103 for population, e.g. of languages area 2122 and/or stroke map area 2123 of data repository 108. The sent data sent by manager system 110 at block 1105 additionally or alternatively can include configuration setting data defining an updated configuration for a teaching session to be presented to a student user.

At block 1106, manager system 110 can be receiving registration data from electronic teaching device 130A which can be iteratively sending registration data at block 1301. The registration data can be defined by a student user and/or a guardian user with use of a displayed user interface such as user interface 3022 depicted in FIG. 3C. User interface 3022 can be displayed on a display of electronic teaching device 130A and/or a client computer device such as client computer device 135A for use by a student user and/or a guardian user associated to a student user.

User interface 3022 can be configured to permit a student user and/or a guardian user to enter various registration data. In area 3024 a student and/or guardian user can enter contact information, e.g. specifying name, address, e-mail account data, social media account data, phone number, and the like. In preferences area 3026 a student and/or guardian user can enter such data as demographic user data specifying, e.g. age, gender, and observed preferences data of the user such as data indicating recreational and/or entertainment activities enjoyed by the user. In area 3028, a student and/or guardian user can enter permissions data specifying permissions of the user which permissions can include such permissions as permissions to permit manager system 110 to obtain data from a social media account of a user via social media system 150. In response to receipt of registration data at block 1106, manager system 110 can assign a UUID for each registered user and at block 1107 can send registration data for storage into data repository 108. In response to the sending by manager system 110 at block 1107, data repository 108 can receive and store registration data, e.g. into users area 2121 at block 1082. In response to completion of block 1107, manager system 110 can proceed to block 1108.

At block 1108, manager system 110 can determine whether one or more criterion has been satisfied for initiation of a teaching session start. At block 1108 manager system 110 according to one embodiment can be monitoring electrical communication data between magnets 131A and 132A as described in FIG. 2B for determining whether a student user has opened an electronic teaching device into an open configuration as depicted in FIG. 2B. In response to the determination that a student user has opened the electronic teaching device into an open configuration device (FIG. 2B) manager system 110 can commence a teaching session, which teaching session can comprise a sequence of challenges to a student user.

Referring to block 1108, manager system 110 can be iteratively performing block 1108 until one or more criterion for commencing a teaching session start are satisfied. In response to one or more criterion for commencement of a teaching session start having been satisfied manager system 110 can initiate stage I of a teaching session and proceed to block 1109.

At block 1109, manager system 110 can be sending prompting data to electronic teaching device 130A for receipt and output by electronic teaching device 130A at block 1302. Prompting data received at block 1302 and presented at block 1302 can include according to one embodiment, the prompting data as depicted in FIGS. 4A-4C.

Figure 4A:
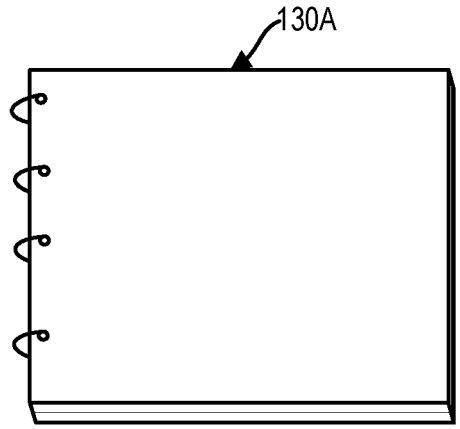
FIGS. 4A-4R depict operations of an electronic teaching device during performance of a teaching session according to one embodiment.
Figure 4B:
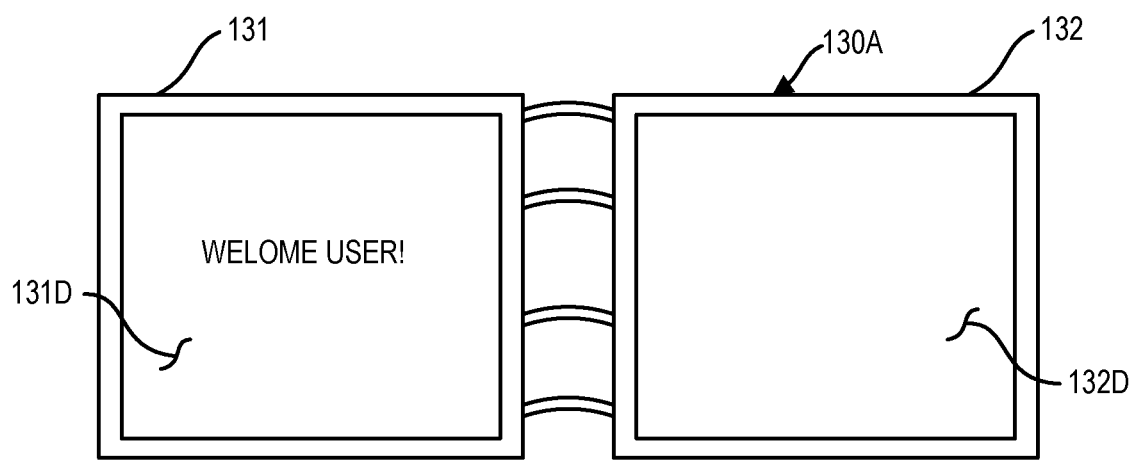
Figure 4C:
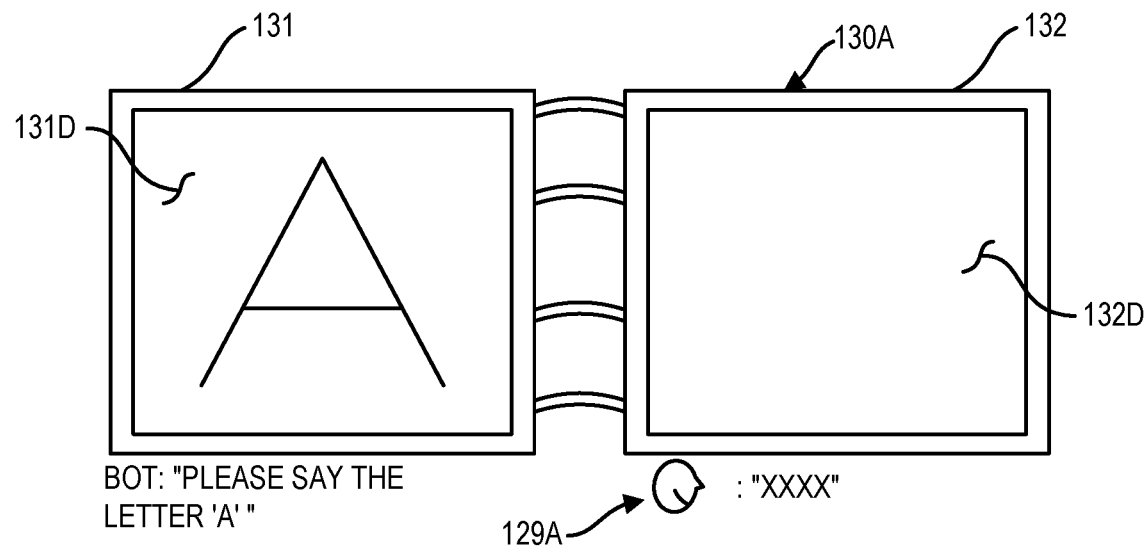
Figure 4D:
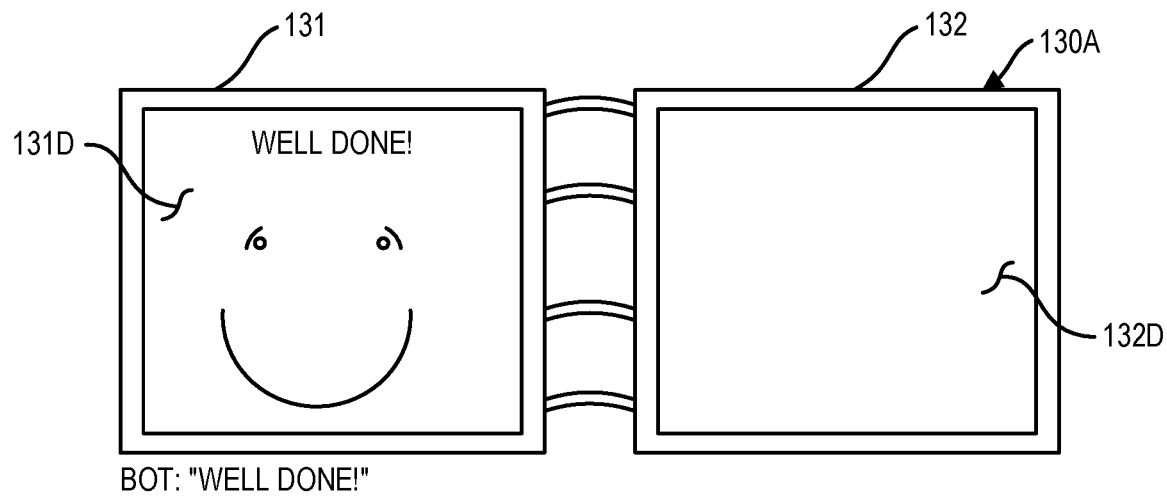
Figure 4E:
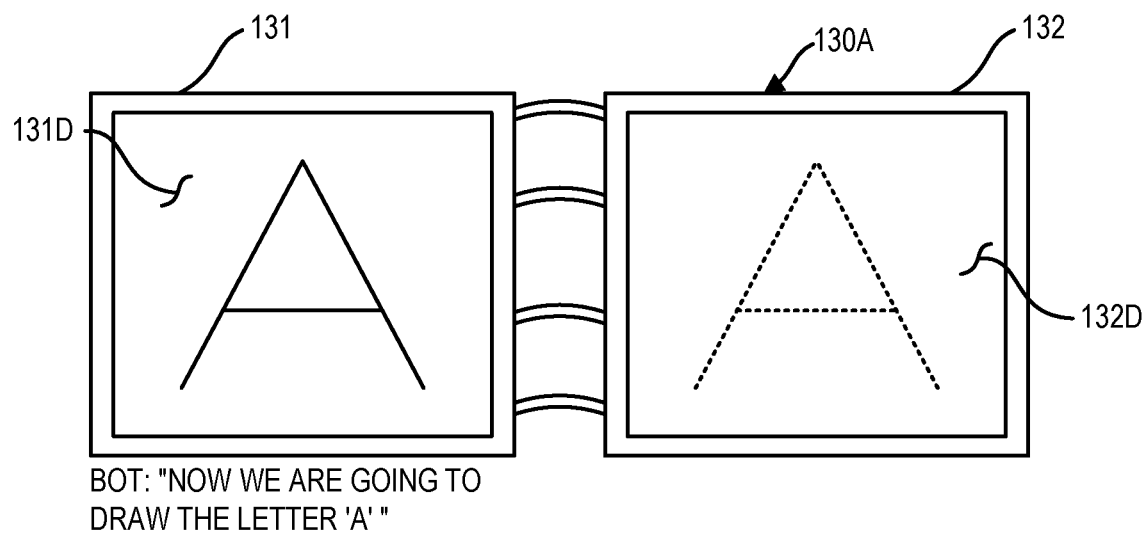
Figure 4F:
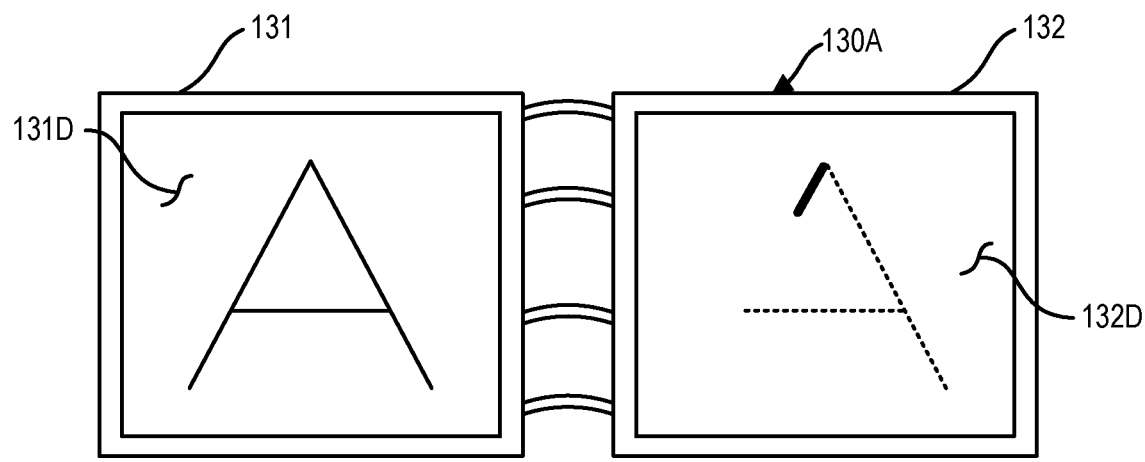
Figure 4G:
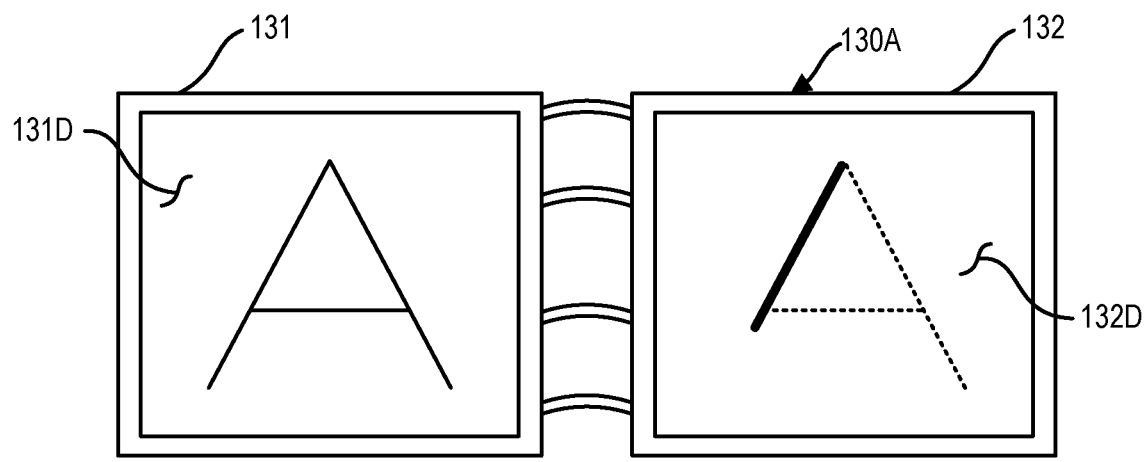
Figure 4H:
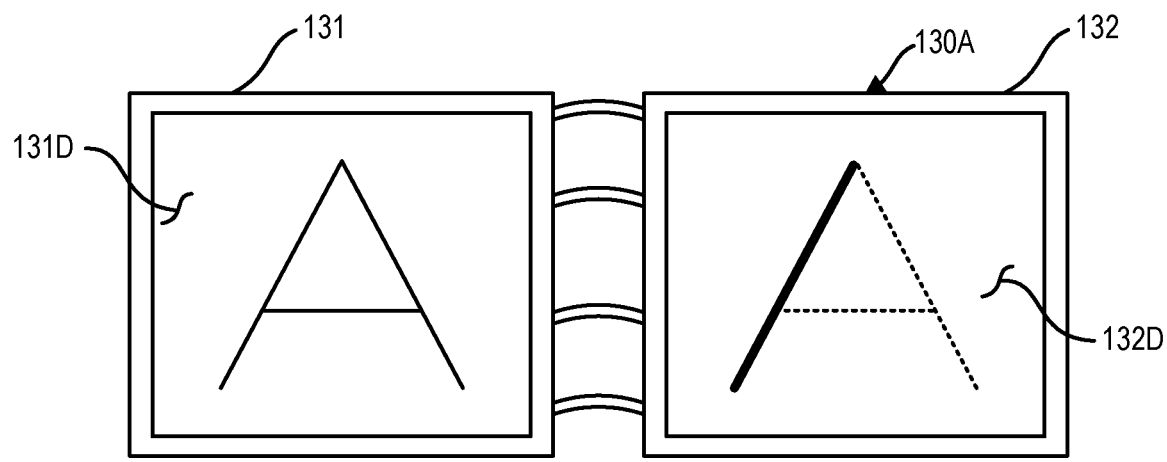
Figure 4I:
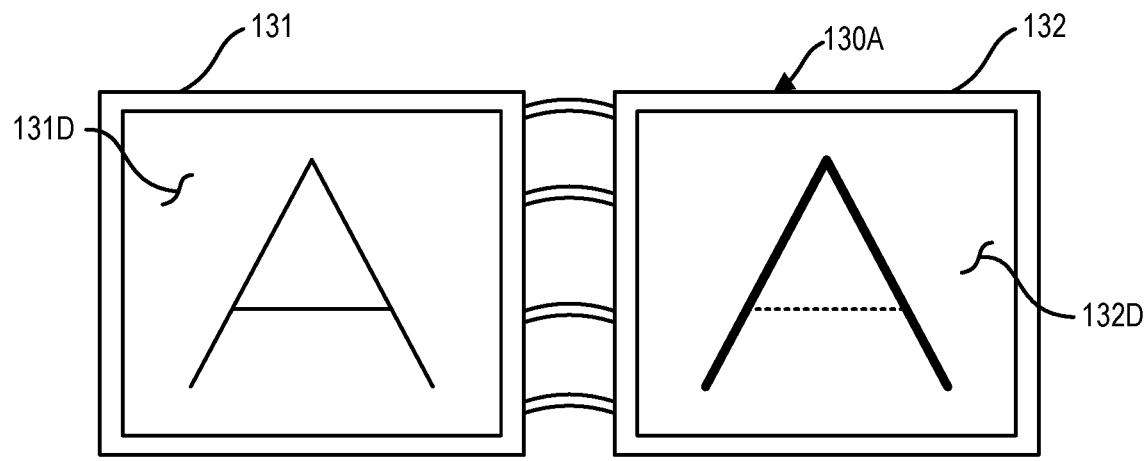
Figure 4J:
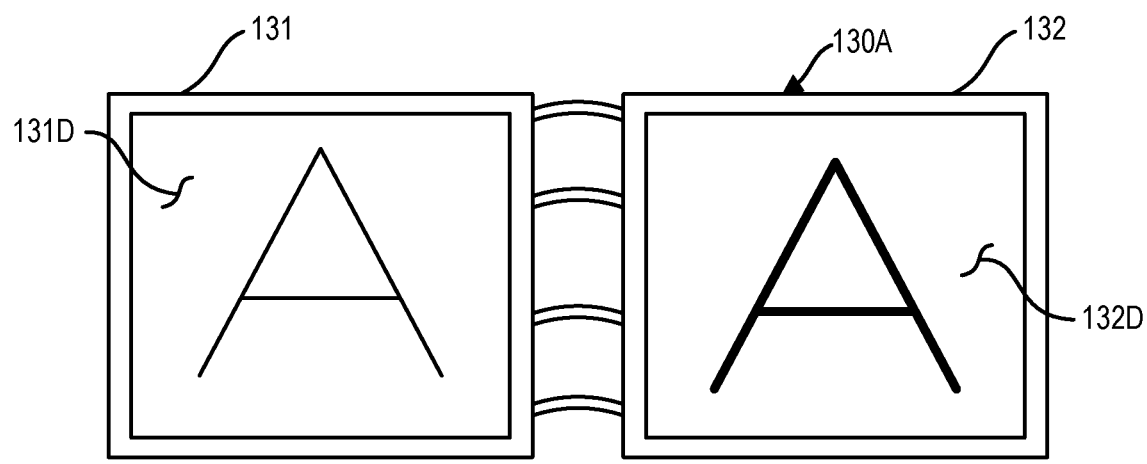
Figure 4K:
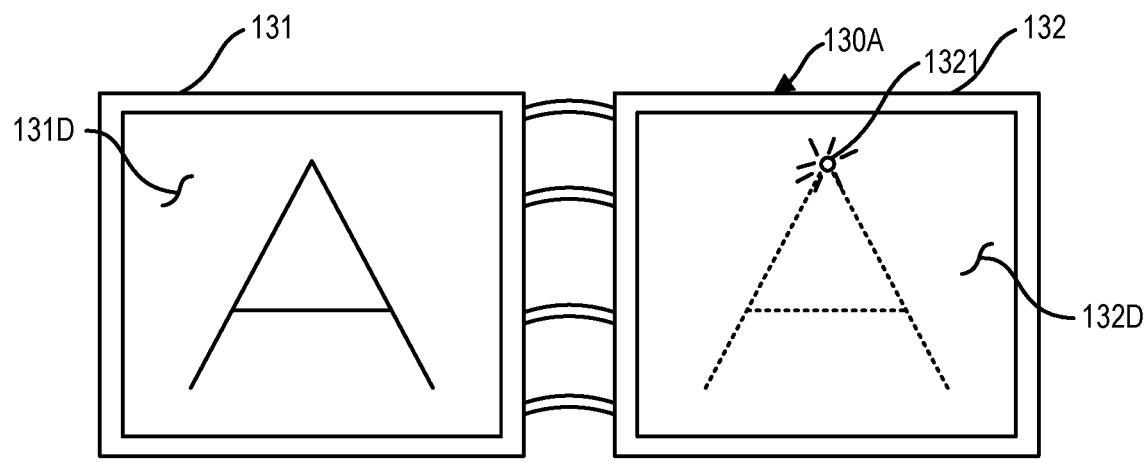
Figure 4L:
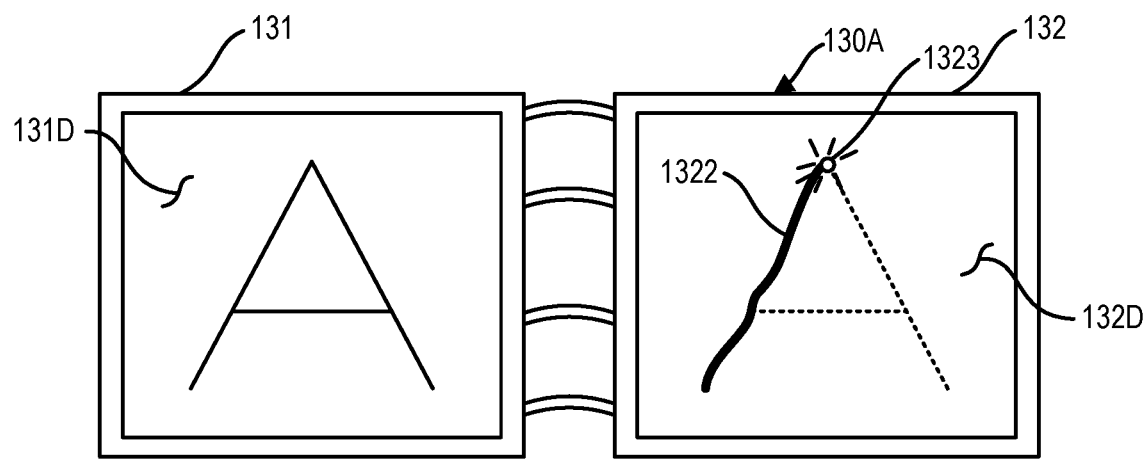
Figure 4M:
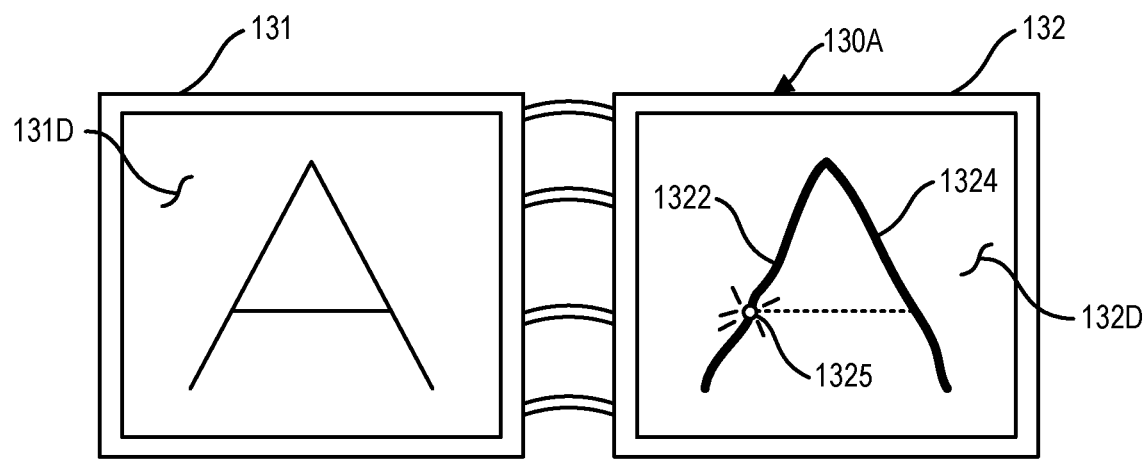
Figure 4N:
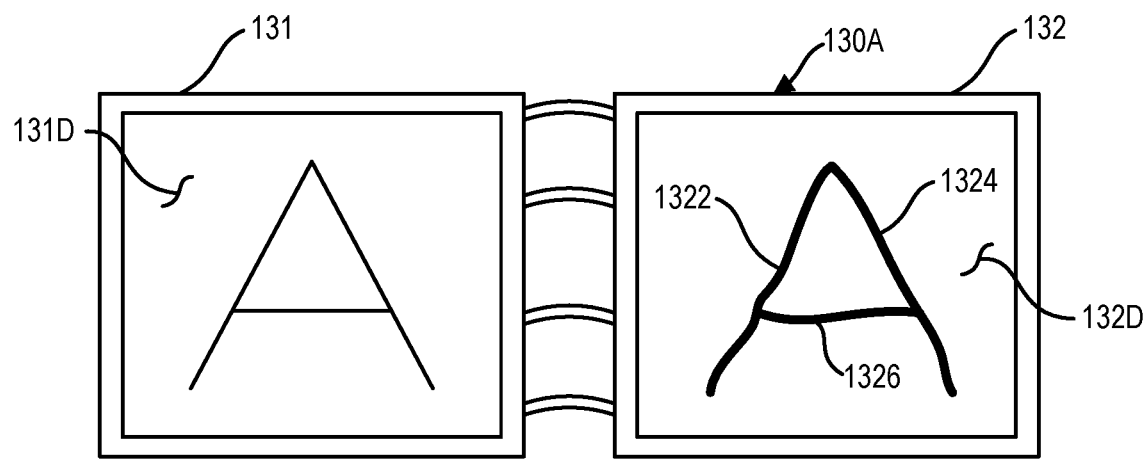
Figure 4O:
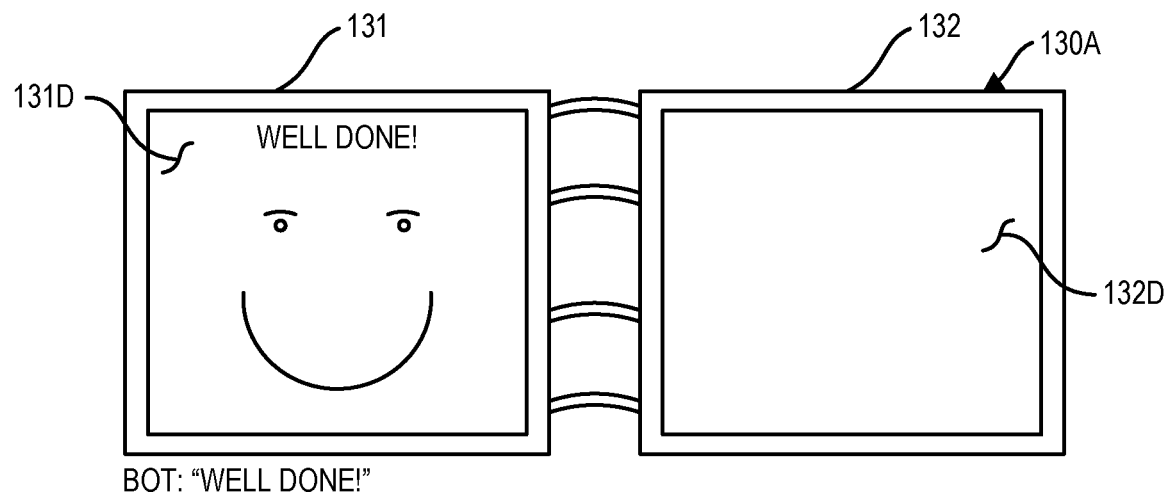
Figure 4P:
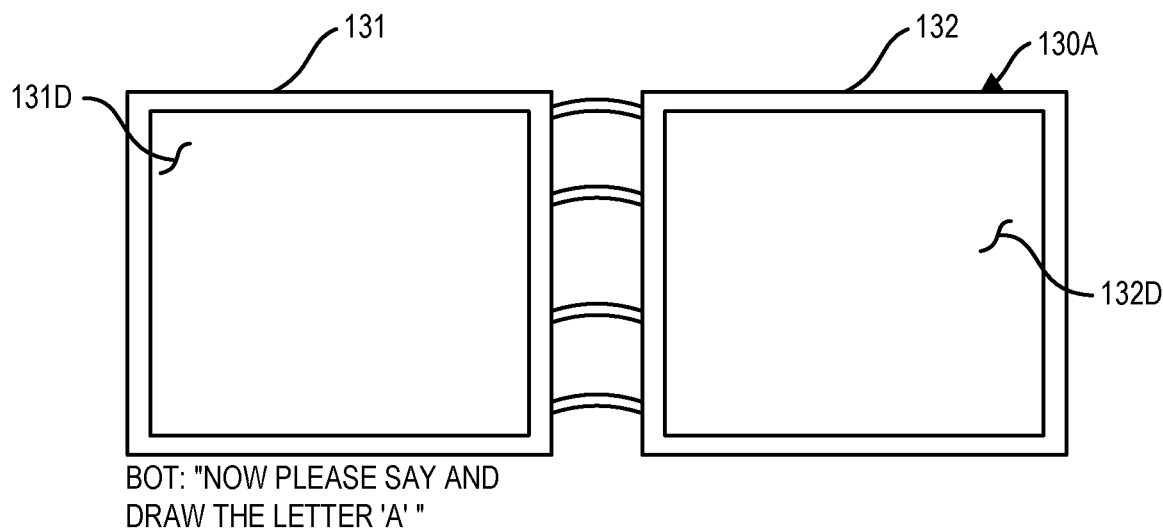
Figure 4Q:
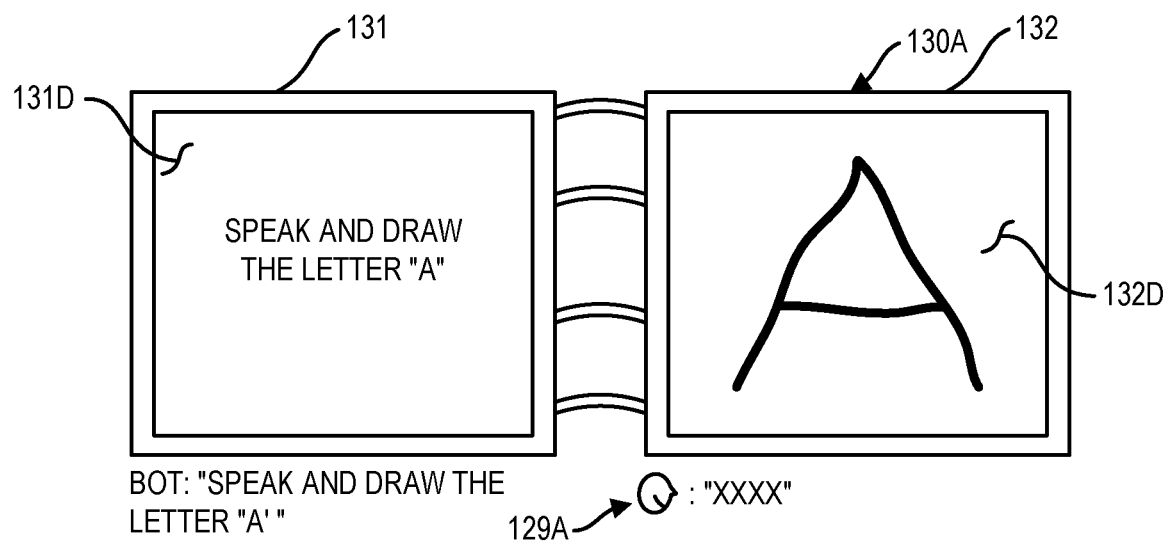
Figure 4R:
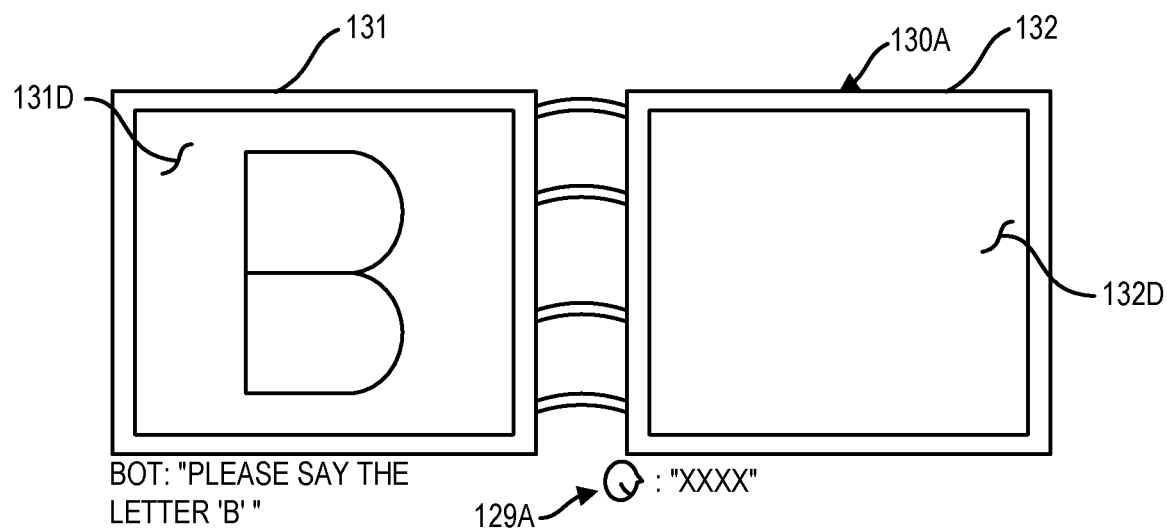

FIGS. 4A-4R depict a sequence of challenges defined by prompting data that can be presented to a user by manager system 110 in the running of a teaching session. FIG. 4A depicts electronic teaching device 130A in closed configuration. FIG. 4B depicts electronic teaching device 130A in open configuration. As described in connection with block 1108, manager system 110 can be configured so that a teaching session is initiated in response to a user opening electronic teaching device 130A into an open configuration as depicted in FIG. 4B. Thus, with reference to FIGS. 4A and 4B, electronic teaching device 130A can be configured so that when a user opens the electronic teaching device 130A into the open configuration (FIG. 4B) a teaching session is commenced as described in connection with the flow from block 1108 to 1109 of the flowchart of FIG. 3A. As described in connection with block 1109, manager system 110 can send prompting data to electronic teaching device 130A in response to a user opening the electronic teaching device 130A into an open configuration as depicted in FIG. 4B. Prompting data sent at block 1109 can include prompting data as depicted in FIG. 4B. The prompting data can include prompting data, which on receipt is presented in text form and/or in audio form. FIG. 4B depicts both a text presentment and an audio presentment of prompting data. Prompting data received and presented at block 1302 can include text based prompting data which can be displayed on display 131D.

Referring to FIG. 4B presented prompting data can include text based prompting data, e.g. the text "WELCOME USER!" presented in display 131D of page 131 and also can include audio presented prompting data, e.g. the BOT audio annunciated prompting data of "WELCOME USER, TODAY WE ARE GOING TO LEARN HOW TO PRONOUNCE AND WRITE LETTERS!".

Referring again to the flowchart of FIG. 3A, manager system 110 can initiate stage I of a teaching session at block 1109. Stage I of a teaching session can include presentment of challenges defined by prompting data to a user, wherein the one or more challenge is a challenge to properly pronounce an alphabet letter, e.g. starting with the first letter of an alphabet being supported by system 100. Such first stage processing is depicted in FIG. 4C. Prompting data depicted in FIG. 4D can be prompting data sent at block 1109 by manager system 110 and received and presented by electronic teaching device 130A at block 1302. Prompting data prompting a user to properly pronounce and alphabet letter as depicted in FIG. 4C can include text based prompting data and audio based prompting data.

Referring to FIG. 4C, prompting data presented to a user can include prompting data displayed on display 131D and can include the text based displayed prompting data of the letter "A" which the user is being prompted to pronounce. The text based prompting data presented on display 131D can be accompanied by audio prompting data. The audio prompting data can be presented by an audio output device of electronic teaching device 130A and can comprise the voice synthesize prompting data referenced to BOT. In reference to the BOT in FIG. 4C and can include the prompting data "PLEASE SAY THE LETTER A".

Referring again to the flowchart of FIG. 3A, the user can respond to the prompting data received and presented at block 1302 at block 1303. At block 1303, electronic teaching device 130A can send response data sent in response to the received prompting data received at block 1302. The sent response data sent at block 1303 can be received by manager system 110 at block 1110. The response data can include, as depicted in FIG. 4C, the student user 129A audibly presenting verbal response data which is picked up by an audio input device of electronic teaching device 130A and recorded as a voice clip and can be sent for evaluation as the aforementioned response data received by manager system 110 at block 1110. The response data can be a voice clip representing audio spoken by student user 129A and specifying the users attempt to pronounce the letter in accordance with the prompting data presented to a user as depicted in FIG. 4C. In response to the received response data at block 1110, manager system 110 can proceed to block 1111.

Figure 3B:
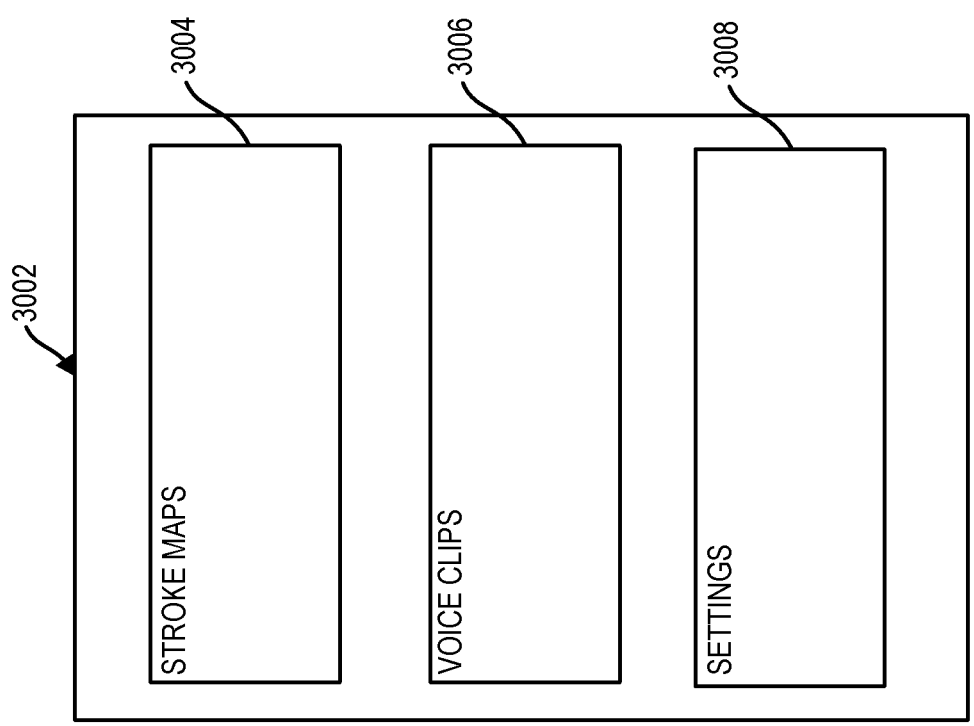
FIG. 3B depicts a user interface for display on a display of an administrator client computer device according to one embodiment.

At block 1111 manager system 110 can perform examining of the response data received at block 1110. Examining of the response data can include multiple queries of data repository 108 as depicted by query receive and respond block 1083 performed by data repository 108 as depicted in the flowchart of FIG. 3A. The examining at block 1111 by manager system 110 can include examining the voice clip defining response data received at block 1110 in reference to reference data that specifies a proper pronunciation of the prompted for alphabet letter prompted with the prompting data presented as depicted in FIG. 4C. The reference pronunciation data can be stored in languages area 2122 of data repository 108 and can be data previously obtained as set forth herein from dictionary service system 140 and/or from configuration data defined by a user using user interface 3002 as shown in FIG. 3B. Manager system 110 performing examining at block 1111 can include manager system 110 scoring the received voice clip data for similarity with the reference pronunciation data stored in languages area 2122 of data repository 108. Manager system 110 can determine that a user has successfully pronounced the prompted for letter prompted for with the prompting data described in FIG. 4C when the score assigned to the voice clip exceeds a threshold.

Manager system 110 at block 1112 can determine whether one or more criterion has been satisfied indicative of the user successfully pronouncing the prompted for letter for which proper pronunciation was prompted for by the presentment of prompting data received and presented at block 1302. As noted, one or more criterion at block 1112 can be satisfied based on a similarity score applied to received voice clip data defining response data received at block 1110 exceeding a threshold. In response to a determination that the user has successfully pronounced the letter prompted for with prompting data sent at block 1109, manager system 110 can proceed to block 1113.

In response to determination that a user has not successfully pronounced the prompted for letter manager system 110 at block 1112 can return to block 1109 to iteratively send additional prompting data to prompt the user to correctly pronounce the prompted for letter. In response to a determination that a user at block 1112 has successfully pronounced the letter, manager system 110 as indicated, can proceed to block 1113 and can present a positive reinforcing prompting data reinforcing to the user that the user has successfully pronounced the prompted for letter. Positive reinforcing prompting data is depicted at FIG. 4D.

In reference to FIG. 4D, manager system 110 on the determination that a user has successfully pronounced a prompted for letter at block 1112 can proceed to block 1113 to send prompting data for receipt and presentment by electronic teaching device 130A at block 1304. FIG. 4D depicts prompting data that can be sent by manager system 110 for receipt and presentment by electronic teaching device 130A at block 1304. The prompting data depicted in FIG. 4D can include prompting data, positively reinforcing to the user that the user has successfully pronounced the prompted for letter which was prompted for at block 1109. The positive reinforcement prompting data depicted as being presented in FIG. 4D can include graphical based prompting data, text based prompting data, and/or audio based prompting data. The displayed text based prompting data depicted as being presented in FIG. 4D can include the text "WELL DONE" depicted as being displayed on display 131D. The graphical based prompting data depicted as being presented in FIG. 4D can include the smiley face which can be displayed on display 131D of electronic teaching device 130A. The audio based prompting data depicted as being presented in FIG. 4D can include electronic teaching device 130A by an audio output device thereof presenting the audio positive reinforcing prompt defined by the output audio prompt "WELL DONE" presented for listening by a user 129A. It should be noted that manager system 110 on the determination at block 1112 that the user has not successfully pronounced a prompted for letter can send negative prompting data to a user, e.g. during a next iteration of send block 1109, in which prompting data is sent to electronic teaching device 130A for presentment by electronic teaching device 130A at a next iteration of block 1302. Such negative prompting data can include negative reinforcement prompting data which can sensitively inform the user that the user has not been successful, but in a manner so as not to discourage the user from further attempting to master the subject matter of the current teaching session. Negative reinforcing prompting data which can be presented to encourage the user can include, e.g. graphical prompting data in the form of a smiley face similar to the form of FIG. 4D, except that the smile may be less pronounced (e.g. a half smile). Negative reinforcing data can also include text based prompting data for display on display 131D and/or audio based prompting data for output by an audio output device of electronic teaching device 130A, text based negative reinforcing prompting data can include such text based prompting data as "NICE TRY USER", and negative reinforcing audio presented prompting data can include electronic teaching device 130A annunciating the audio prompt "NICE TRY USER".

Referring again to the prompting data sent at block 1113 for receipt and presentment by electronic teaching device 130A at block 1304, stage II prompting data can include prompting data that prompts a user to enter electronic handwritten text to properly write and form a prompted letter.

FIGS. 4E-4N depict prompting data sent at block 1113 for receipt and presentment at block 1304 for prompting the user to correctly write and form an alphabet letter, e.g. starting with the first letter of an alphabet such as the letter "A" in the English language. Prompting data depicted as presented in FIG. 4E can include the letter "A" displayed on display 131D in undashed normal form and can include a display on display 132D the letter "A" in dashed form. The dashed form presentment indicated to the user that the user is being prompted to complete the letter that is presented in dashed form on display 132D which can be, for example, a touchscreen display that is sensitive to the users touch by finger and/or stylus. Prompting data specified in FIG. 4E can be accompanied by audio prompting data such as the audio prompt output by an audio output device of electronic teaching device 130A. The audio prompt of "NOW WE ARE GOING TO DRAW THE LETTER 'A'".

Referring to FIGS. 4F-4J, prompting data for presentment on electronic teaching device 130A can include prompting data that graphically animates a time ordered sequence of keystrokes that can be performed by a user to properly draw a prompted for alphabet letter. FIGS. 4F-4J depict prompting data according to a stroke map defining the sequence of strokes, wherein the letter "A" is formed by the stroke sequence as follows: (a) first stroke defining a left angled line from top center apex to lower left corner, (b) a second stroke defining a right angled line from a top center apex to lower right corner, (c) a third stroke defining a horizontal line extending left to right connecting the left angled line to the right angled line As shown in FIGS. 4F-4J, display 132D can display animated time order graphical data that specifies to the user a correct order of strokes to form the letter "A" in accordance with the described stroke map. Referring to FIGS. 4F-4H a progression of screen displays can be displayed to indicate the correct formation of the left line segment defining the letter "A". Referring to FIG. 4F, a small line segment of the left line of the letter "A" is displayed and then, with reference to FIG. 4G, a larger segment of the left line of the letter "A" is displayed and then, in FIG. 4H, the full portion of the left line of the letter "A" is displayed. Manager system 110 can display the screen displays of FIGS. 4F-4H in sequence so that the user is informed as to the precise manner in which a stroke can be performed to define the left line of the letter "A". Namely, commencing from the top center position and moving downward in an angle to the left lower corner position.

It can be seen that there are many possible modifications of the process for presentment of prompting data as depicted in FIGS. 4F-4H. For example, the growth over time of the left line of the letter "A" can be presented with a larger number of screen displays, e.g. breaking down the formation of the left line of the letter "A" into N segments as opposed to three segments as depicted in FIGS. 4F-4H or fewer screen displays can be displayed. For example, the sequence of three screen displays can be reduced to two screen displays, but still show the user the correct progression of a stroke for the formation of the left angled line of the letter "A".

FIG. 4I depicts formation of the right line of a letter "A". With reference to FIG. 4I, with the horizontal center line of the letter "A" remaining in dashed form and the right line depicted in solid form, the user is informed that the user for the correct formation of the letter "A" should draw the right line of the letter "A" after the left line of the letter "A" and before drawing the center horizontal line of the letter "A". FIG. 4I is presented for brevity but in reality, the screenshot depicted in FIG. 4I can be broken down and presented over several screenshots, such as screenshots that gradually show the formation of the right line of the letter "A" as depicted in FIG. 4I growing over a series of screenshots. In the manner of the left line of the letter "A" depicted with the animated sequence of screenshots of FIGS. 4F-4H.

Referring to FIG. 4J, the prompting data depicts to the user the formation of the horizontal line of the letter "A". Prior to prompting data of FIG. 4J being displayed, electronic teaching device 130A on display 132D can present the letter "A" with the horizontal line thereof presented in dashed form as presented in FIG. 4I so that it is reinforced to the user that the drawing of the horizontal line of the letter "A" is the final step in the correct formation of the letter "A".

Referring to FIG. 4G, the display to the user of the prompting data of FIG. 4J can be broken down into a sequence of screen displays which illustrate in a manner described with reference to FIG. 4F-4H the gradual formation of the horizontal line of FIG. 4J progressing over a series of screenshots to depict the particular manner in which a keystroke for formation of the horizontal line of the letter "A" is to be performed. Namely, starting from the left position at the left line of the letter "A" and progressing rightward over time so that the drawn horizontal line connects to the right line of the letter "A" depicted in FIG. 4J.

According to one embodiment, manager system 110 can present the time order prompting data described in connection with FIGS. 4A-4J iteratively N times, e.g. one time, two times, three times, or M times to reinforce to the user the proper time order progression of strokes for the formation of the letter "A" according to a certain keymap. According to another aspect, which is described in further detail herein, manager system 110 at block 1113 can select one keymap for guiding the formation of a letter out of a set of candidate stroke maps for the letter.

Now referring to FIG. 4K, after the user is presented iteratively the lesson depicted with the progression of FIGS. 4A-4J to reinforce the proper formation of the letter, the user is provided prompting data to prompt the user to initiate formation the letter for which a formation lesson was just presented. Referring to FIG. 4K, visible indicator 1321 which can be provided by a flashing dot can be presented to a user as part of the presented prompting data presented at block 1304. Visible indicator 1321 prompts the user as to the location of a first stroke for the formation of the letter "A" in accordance with the current stroke map for the letter "A", which location as referenced in FIG. 4K is a top center position, in accordance with the prompting data presented in FIGS. 4F-4H, depicting the growth of the left line of the letter "A" from the top center position. The user, having just been presented a lesson as to the formation of a letter "A" can draw, with electronically hand drawn line 1322, the first line of the letter "A". The electronically hand drawn data input by the user as depicted in FIG. 4L can be sent by electronic teaching device 130A at block 1303 as response data for sending by electronic teaching device 130A at block 1303 for receipt by manager system 110 at block 1114.

According to some embodiments, manager system 110 can be configured so that visible indicator 1321 (and next described visible indicators 1323 and 1325 as shown in FIGS. 4M and 4L) progressively move responsively to a student user advancing the drawing of a letter line so that the visible indicator e.g. flashing dot iteratively prompts the user by indicating to the user a next position to which the letter line currently being drawn needs to be advanced for correct completion of drawing of the letter line currently being drawn. Visible indicators 1321, 1323, 1325 can be provided e.g. by flashing dots, brightened areas of a display, and or areas of a display displayed in a different color.

Manager system 110 can be examining the received response data received at block 1114 at examining block 1115. The examining of received response data received at block 1114 at block 1115 can include multiple queries of stroke map data of stroke map area 2123 and therefore can include multiple queries of data repository 108 as depicted by query receive and respond block 1084 performed by data repository 108.

At block 1116, manager system 110 can be determining whether one or more criterion is satisfied indicative of the user having properly formed the letter. In response to a determination that a user has not properly formed a letter, manager system 110 can return to block 1113 to iteratively send additional prompting data to a user until the user properly forms the prompted for letter.

Referring to FIG. 4L, manager system 110 at block 1116 can determine that a user has drawn only a portion of the prompted for letter and not the full letter and therefore, can return to block 1113 to iteratively send additional prompting data prompting the user to continue drawing the prompted for letter. On the determination, based on the examining at block 1115, that a first line of a prompted for letter has been properly formed, manager system 110 as depicted in FIG. 4L can present prompting data defining visible indicator 132 e.g. provided by a flashing dot which specifies to the user the location for initiating a second stroke for defining a prompted for letter. In the described embodiment, the second stroke for the formation of the letter "A" is at the same location of the first stroke for the letter "A". Namely, at a top center location. Accordingly, visible indicator 1323 in the described embodiment of FIG. 4L, can be presented at the top center location depicted in FIG. 4L. The user having just received the lesson for the proper formation of the letter "A" can then electronically hand draw the line 1324 depicted in FIG. 4M.

Manager system 110 at examining block 1115 can determine that the user has successfully drawn the second line 1324 defining the letter "A", and therefore at a next iteration of send block 1113 can send prompting data for presentment of the visible indicator 1325 depicted in FIG. 4M, depicting the proper start location of the third key stroke for defining the letter "A" in accordance with the current stroke map, defining formation of the letter "A". In response to the presentment of visible indicator 1325, the user can be prompted to draw the third line defining the prompted for letter "A", namely the horizontal line connecting the first line and the second line.

As depicted in FIG. 4N, the user can electronically enter handwritten data defining hand drawn horizontal line 1326, which electronically entered data can be sent as a next iteration of response data sent at block 1305. During a next iteration of examining block at block 1115 in response to the most recent iteration of response data received at block 1114, manager system 110 can determine that the user has properly written and formed the prompted for letter "A". Accordingly, during a next iteration of block 1116, in which manager system 110 determines whether one or more criterion has been satisfied for advancing to the next stage, manager system 110 can determine that the user has properly formed the prompted for letter "A".

Manager system 110 at examining block 1115 can activate letter evaluation process 114 (FIG. 1). Manager system 110 running letter evaluation process 114 can examine electronically input handwritten data of a student user in reference to stroke map data stored for a certain letter in stroke map area 2123. Manager system 110 running letter evaluation process 114 can score electronically input handwritten data input by a student user using an electronic teaching device of electronic teaching devices 130A-130Z to return a similarity score that indicates a similarity of input handwritten data as compared to stroke map data for a certain user. Manager system 110 in response to a determination that a returned similarity score has exceeded a threshold can determine that a user has properly entered electronic handwritten data to properly define the alphabet letter having an associated stroke map data stored in stroke map area 2123. In response to determining that a user has properly formed a prompted for letter at block 1116, manager system 110 can proceed to block 1117.

At block 1117, manager system 110 can send next prompting data for receipt and presentment by electronic teaching device 130A at block 1306. The prompting data received and presented at block 1306 can include positive reinforcing prompting data to positively reinforce to the user that the user has successfully electronically entered handwritten data properly forming a prompted for letter. The positive reinforcing prompting data presented at block 1306 can include prompting data depicted in FIG. 4O and can include text based positive reinforcing prompting data, e.g. the text "WELL DONE!", the graphical based positive reinforcing prompting data, e.g. the smiley face depicted in FIG. 4O displayed on display 131D, and the audio based positive reinforcing prompting data, e.g. the audio prompt that can be output by electronic teaching device 130A of "WELL DONE!".

At block 1117, manager system 110 can commence stage III processing in which manager system 110 prompts the user to enter audio data representing the proper pronunciation of a prompted for letter together with electronically entered handwritten data representing the proper formation of the letter.

FIG. 4P illustrates prompting data presented at block 1306 for stage III challenges presented to the user to prompt the user to enter audio data defining a proper pronunciation of a letter together with electronically entered handwritten data depicting the proper formation of a letter. The prompting data associated with stage III can take on many forms, but in one form can include high level prompting data which provides minimal level of prompting to the user to pose a significant challenge to the user to confirm that the user has retained the lessons of the previous prompting. In one embodiment, the prompting data of stage III processing can progress over time going from high level prompting to more granular prompting if the user does not perform in a timely manner in response to the high level prompting. According to one embodiment, as depicted in FIG. 4P depicting high level prompting, presented prompting data presented at block 1306, can include a general high level prompt, which is presented, e.g. only in audio form and can include an audio output device of electronic teaching device 130A presenting the general audio prompt "NOW, PLEASE SAY AND DRAW THE LETTER 'A'". In response to the general prompting, the user can enter response data into electronic teaching device 130A which can be sent at send block 1307 as response data for receipt by manager system 110 at block 1118. The response data received at block 1118 can include a combination of voice clips associated to voice inputs presented by a user in combination with electronically entered handwritten data entered by a user in response to the prompting data presented at block 1306 as depicted in FIG. 4P, which prompting data can iteratively progress into more detailed forms over time, in response to insufficient response data of the user.

At block 1119, manager system 110 can perform examining of response data received at block 1118. The examining by manager system 1119 can include multiple queries of data repository 108 as depicted by query receive and respond block 1085, performed by data repository 108.

At block 1120, manager system 110 can determine whether one or more criterion has been satisfied indicating that the student user has successfully completed the stage III processing, meaning that the user has successfully entered audio data represented as a voice clip defining response data representing a proper pronunciation of the prompted for letter together with electronically entered handwritten data representing proper formation of the letter. In response to the determination that the user has successfully presented a correct pronunciation of a letter in combination with a correct formation of the letter, manager system 110 can proceed to block 1121 to advance the letter of the current teaching session. For example, if a teaching session has commenced with the letter "A" the advanced letter, advanced to block 1121, can be the letter "B" in the English language. Manager system 110 can then proceed to block 1122.

At block 1122, manager system 110 can return to block 1109 where manager system 110 can perform stage I processing, except now with respect to the next letter in the English alphabet, e.g. the letter "B" where a user was previously most recently trained in respect to the letter "A".

FIG. 4Q illustrates electronic teaching device 130A presenting prompting data to a user in response to the received prompting data received a block 1306. The prompting data illustrated in FIG. 4Q can prompt a student user to both correctly speak and draw a letter. Prompting data presented to a user, as indicated in FIG. 4Q, can include text based prompting data and audio based prompting data. In response to the received prompting data received at block 1306, electronic teaching device 130A at block 1306 can present text based prompting data on display 131D, e.g. this text based prompting data "SPEAK AND DRAW THE LETTER 'A'", the audio based prompting data presented to user at block 1306 can include the audio voice synthesized output of "SPEAK AND DRAW THE LETTER 'A'", as indicated in FIG. 4Q. In response to the prompting data, the student user can electronically enter handwritten data to hand draw the letter "A" onto display 132D which, as noted, can be configured as a touchscreen display. The student user 129A can contemporaneously correctly pronounce the letter "A", e.g. by entering voice data recorded as a voice clip that specifies the audio voice message (the voice message specifying the correct pronunciation for the letter "A"). Manager system 110 at block 1122 can return to block 1109 with the current alphabet letter advance to the next successive letter in the alphabet for which associated to a current teaching session.

Referring to the loop of blocks 1109-1120, manager system 110 can be configured to iteratively provide prompting data to a student user and can iteratively examine response data responsively defined by the student user. The prompting data can include first prompting data (block 1109) for prompting a student user enter voice data defining a correct pronunciation for a certain letter, and second prompting data (block 1113) prompting the student user to electronically enter handwritten data defining a correct drawing of the certain letter. For each letter for which a lesson is being provided, manager system 110 can be restricted from providing the second prompting data (prompting proper letter formation) until manager system 110 determines by examination of response data provided by voice data entered in response to the first prompting data that the student user has correctly pronounced the certain letter. In such manner focus of the user to an isolated segment of a lesson is maintained so that the student user is able to better retain the material of the lesson.

Referring to the loop of blocks 1109-1120, manager system 110 can be configured further to be restricted from prompting data associated to a next successive letter of a language alphabet relative to a certain letter until manager system 110 examining response data of a student user has determined that the student user has correctly (a) pronounced the certain letter in response to first prompting data prompting the student user to correctly pronounce the certain letter wherein the first prompting data is absent of prompting data prompting the student user to correctly draw the certain letter (stage I), (b) drawn the certain letter in response to second prompting data prompting the student user to correctly pronounce the certain letter wherein the second prompting data is absent of prompting data prompting the student user to correctly pronounce the certain letter (stage II), and (c) pronounced the certain letter while contemporaneously drawing the certain letter in response to third prompting data wherein the third prompting data has prompted the student user to correctly pronounce the certain letter while contemporaneously correcting drawing the certain letter (stage III). In such manner focus of the user to an isolated segment of a lesson is maintained so that the student user is able to better retain the material of the lesson.

FIG. 4R illustrates prompting data presented to user during a next iteration of prompting data at block 1109 after manager system 110 advances the current alphabet letter to a next successive alphabet letter associated to the current training session. The next successive alphabet letter relative to the letter "A" in the English language is "B". Accordingly, prompting data sent during a next iteration of block 1109 can include prompting data prompting the user, according to stage I processing, to correctly enter an audio input specifying the correct pronunciation for the letter "B". In response to prompting data sent at block 1109, electronic teaching device 130A can present to a student user the received prompting data at block 1302.

Prompting data presented to a user as depicted in FIG. 4R, can include text based prompting data and audio, e.g. synthesized voice based prompting data. As shown in FIG. 4R, text based prompting data can be displayed on display 131D, e.g. there can be displayed as depicted in FIG. 4R the letter "B", which the student user is being prompted to present the correct pronunciation for. Accompanying the presentment of the text based data displayed on display 131D, electronic teaching device 130A can output an audio output message to prompt a student user to correctly pronounce the letter "B". Such an output audio message can include the message "PLEASE SAY THE LETTER 'B'". In response to the prompting data the user can enter audio input data. The student user input audio data can specify the correct pronunciation for the letter "B". It will be seen during a next iteration of the loop comprising blocks 1109-1119 can include manager system 110 determining that a user has correctly entered an audio input recorded as a voice clip to correctly pronounce the letter "B" and responsively to a determination that a student user has presented correct pronunciation for the letter "B" can, at block 1113 send prompting data to prompt the student user to correctly electronically draw the letter "B", in accordance with a selected stroke map, the selected stroke map for guiding the drawing of the letter "B" can be selected, like as in the case for the letter "A" can be selected from set of candidate stroke maps for the letter "B", which candidate stroke maps can be obtained and stored in stroke map area stroke map area 2123 based on, e.g. an examination of electronically entered handwritten data of social media system 150 and/or by examination of configuration data defined by an administrator user using a user interface such as user interface 3002, as described in connection with FIG. 3B.

Candidate stroke maps for the letter "B" can specify different stroke sequences for the letter "B". For example, a first stroke map can specify: (a) draw straight line down starting from the top left corner to the lower look left corner; (b) draw a curved line starting from the top left corner of the left line and terminating at the midpoint of the left line; and (c) draw a curved line starting at the midpoint of the left line and terminating at the lower left corner point of the left line. Another stroke map for the letter "B" can specify, e.g. (a) draw a curved line commencing at the top left corner and terminating at a left center point; (b) draw a rightward bulging curved line starting at the left midpoint and terminating at the lower left corner; and (c) draw a straight vertical line upward from the lower left corner to the top left corner and connecting endpoints of the bulging curved lines of (a) and (b).

Throughout the course of manager system 110 running a training session, manager system 110 can iteratively determine whether an exit one or more criterion has been satisfied. An exit one or more criterion can include such criterion as (a) that the student user has closed the electronic teaching device into a closed configuration is shown in FIG. 2A; or that (b) a timeout condition has occurred, i.e. that the student user has not responded to prompting data within a time threshold period of time. In decision blocks 1131-1133 manager system 110 can perform evaluating of whether an exit one or more criterion has been satisfied. On the determination that an exit one or more criterion has been satisfied, manager system 110 can proceed to block 1123.

At block 1123, manager system 110 can send session data for receipt and storage by data repository 108 at block 1086. The session data stored at block 1086 can be stored in history area 2124 of data repository 108. The session data stored at block 1086 can include performance data that specifies the performance of the student user during the just terminated teaching session. Performance data can specify, e.g. whether the student user correctly pronounced a letter, whether the student user correctly drew a letter, and such success or failure performance data can be stored for each letter for which the student user received prompting data during the just terminated teaching session. Performance data stored at block 1086 can include performance score data. For example, manager system 110 can assign performance score to a student user in dependence on the number of iterations of prompting data presented to student user prior to the student user correctly pronouncing letter or correctly drawing a letter. Manager system 110, for example, can assign the highest performance score to the student user, where the student user correctly pronounces or draws a letter in response to only one iteration of prompting data and can assign correspondingly lower performance scores where the student user correctly pronounces or draws a letter but in response to additional one or more iterations prompting data. Manager system 110 can assign a lowest post performance score to student user, where the student user is unable to correctly pronounce or draw letter in response to a maximum number of iterations of prompting data.

Session data sent at block 1123 and stored at block 1086 can also include termination point session data that specifies the point of a training session at which the training session was just terminated. The termination point data can specify, e.g. the alphabet letter which the student user is currently receiving prompting data for at the time of the termination of the just terminated teaching session.

With respect to the loop of blocks 1108-1123, embodiments herein recognize that manager system 110 can be performing multiple instances of a teaching session described herein contemporaneously and simultaneously, wherein each different teaching session can be associated to a different student user. Embodiments herein further recognize that the receiving and storing of blocks 1086 can be performed for each teaching session mediated by manager system 110 over the course of deployment of system 100. Thus, there can be stored in history area 2124 session data for all teaching sessions mediated by manager system 110 over the course of the deployment of system 100 over time, which can include multiple teaching sessions for each of multiple different student users. In response to completion of block 1123 manager system 110 can proceed to block 1124.

At block 1124, manager system 110 can perform machine learning training of one or more predictive model stored in models area 2126 of data repository 108. Aspects of predictive model which can be subject to training with use of training data at machine learning training block 1124 is described in FIGS. 5A and 5B. On completion of block 1124 manager system 110 can proceed to block 1125. At block 1125, manager system 110 can return to block 1101.

Referring to FIG. 5A, there is shown predictive model 5002 predictive model 5002, according to one embodiment, as shown in FIG. 5A can be trained with training data so that predictive model 5002 is configured to return predictions as to a predicted performance of a user in response to the student user being subjected to prompting data in accordance with a certain stroke map. As set forth herein manager system 110, when providing student user prompting data prompting a user to correctly draw a certain alphabet letter, can select from can select one stroke map from a set of candidate stroke maps and the prompting data for prompting the student user to correctly draw the certain letter can be prompting data in accordance with the stroke sequence defined within the selected stroke map.

Predictive model 5002 as set forth in FIG. 5A can be trained with training data so that predictive model 5002 can be used for selection of one stroke map out of a set of candidate stroke maps and the selected stroke map can be used for guiding a student user to correctly draw an alphabet letter. According to one embodiment, manager system 110 at block 1113 can use predictive model 5002 for sending prompting data for prompting a user to correctly draw an alphabet letter. Use of predictive model 5002 in such a scenario is now described. Predictive model 5002 can be trained with training data, so that predictive model 5002 once trained, is able to respond to query data to return predicted performance data specifying predicted performance of a student user in response to the student user being presented with prompting data, prompting the user to correctly draw an alphabet letter in accordance with a select certain stroke map. Query data for querying predictive model 5002 can include stroke map data and skill level data for the user.

In one scenario, there can be K candidate stroke maps for a given alphabet letter for which the student user is receiving a lesson. Manager system 110 can query predictive model 5002 K times for each of the K candidate stroke maps for the letter. The query data comprising stroke map data can be accompanied by skill level data that determines a skill level for the student user associated to a current training session. Queried, as described predictive model 5002 can return predicted performance data for each of the K different stroke maps for the certain alphabet letter. Manager system 110 can select a stroke map returning the best predicted performance data as the selected stroke map for use in prompting the user with prompting data at block 1113.

The skill level of a student user can be determined in multiple ways. For example, the skill level of a student user can be determined by examining the performance data of the student user during teaching sessions. According to one embodiment, skill level data for a student user can be determined using teaching session performance data only for portions of the teaching session that are maintained constant for all student users over the course of deployment of system 100. According to one embodiment, skill level data can be inferred, e.g. based on age or grade level of the student user. According to one embodiment, skill level can be based on a combination of performance data of the user and inferred skill level of the user based on, e.g. age or grade level. According to one embodiment, the skill level of the student user can be an inferred skill level during an initial training session of the user, but over time the skill level data can be provided to be increasingly dependent on performance data of the student user.

Manager system 110 can perform training of predictive model 5002. At block 1124, manager system 110 can apply iterations of training datasets to predictive model 5002 and once predictive model 5002 has been trained with sufficient amounts for training data, predictive model 5002 can be capable of returning predictions with a threshold exceeding level of confidence. Training datasets for training of predictive model 5002 can be applied after each teaching session mediated by manager system 110 for all users of system 100. As depicted in FIG. 5A, a training dataset can include stroke map data for an alphabet letter, skill level data for the student user associated to the session teaching lesson, and performance data for the student user associated to the completed teaching session. Predictive model 5002 once trained with iterations of training dataset is able to learn relationships between stroke map data for a teaching session, skill level data, and performance data in a manner so that predictive model 5002, once sufficiently trained, is able to return predictions for the performance prediction specifying predicted performance data for a student user in dependence on candidate stroke map data and skill level data for the student user. Thus, in response to query data that includes candidate stroke map data and skill level data, predictive model 5002 is able to predict performance data for the student user and therefore is able to select one stroke map from a set of candidate maps based on the one stroke map being predicted to return the best performance data for the student user.

Figure 5B:
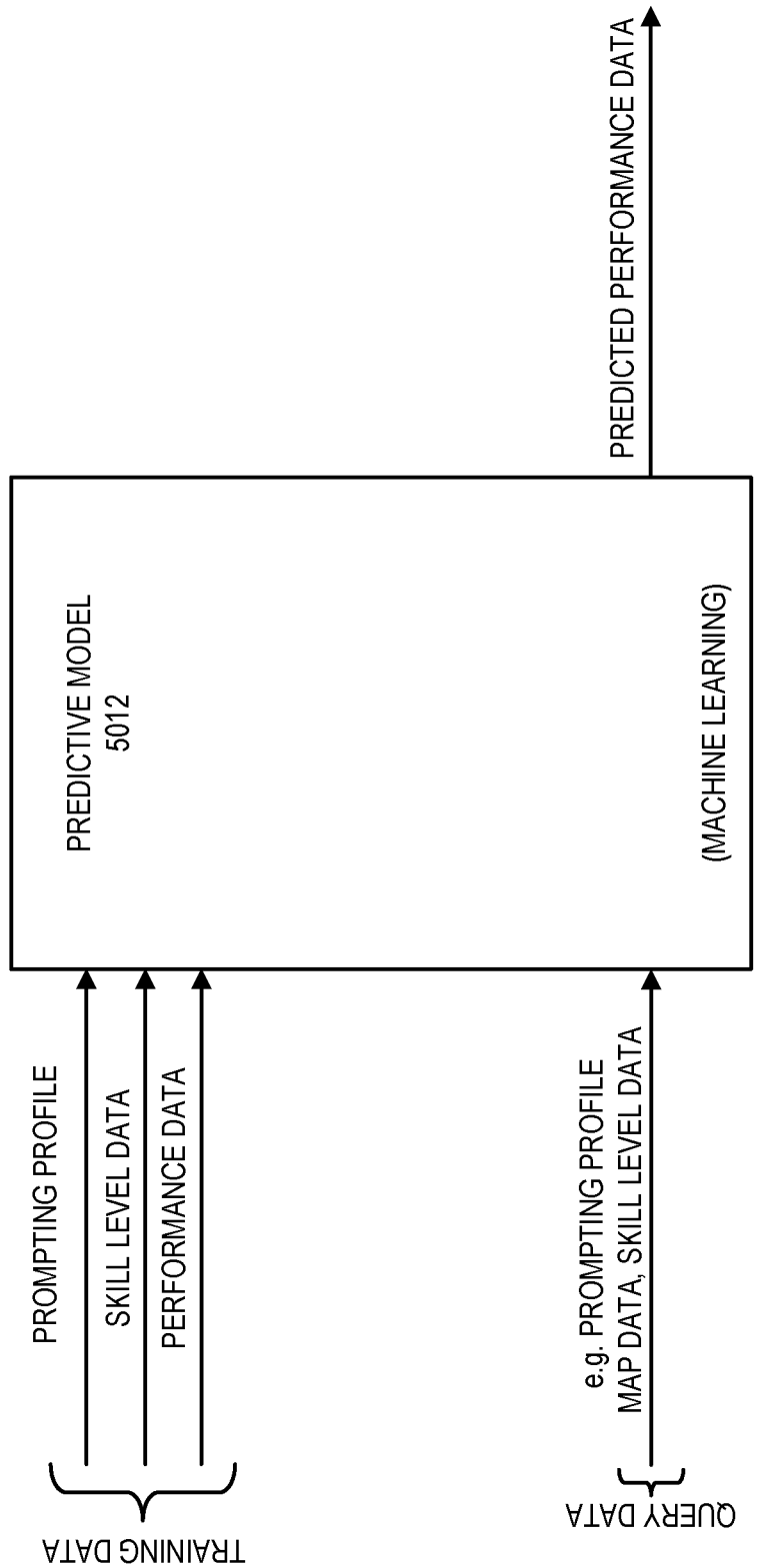

Manager system 110 can perform training of predictive model 5012. Predictive model 5012 is similar to predictive model 5002 for use in selecting a best performing stroke map except predictive model 5012 can be used for predicting best a performing prompting profile. Manager system 110 can be adapted to deploy different prompting profiles to different student users, the different prompting profiles defining by different sets of prompting data (e.g. characterized by having different graphics, different delay times, different prompting data sequences, different audio prompts, and the like). According to one embodiment, data defining prompting profiles can be stored in languages area 2122 and there can be stored in languages area data defining a plurality of prompting profiles for each language supported. Manager system 110 can train predictive model 5012 with use of machine learning processes so that predictive model 5012 learns best performing prompting profiles over time. At block 1124, manager system 110 can apply iterations of training datasets to predictive model 5012 and once predictive model 5012 has been trained with sufficient amounts for training data, predictive model 5012 can be capable of returning predictions with a threshold exceeding level of confidence. Training datasets for training of predictive model 5012 can be applied after each teaching session mediated by manager system 110 for all users of system 100. As depicted in FIG. 5B, a training dataset can include prompting profile data for an alphabet letter, skill level data for the student user associated to the session teaching lesson, and performance data for the student user associated to the completed teaching session.

Predictive model 5012 once trained with iterations of training dataset is able to learn relationships between prompting profiles for a teaching session, skill level data, and performance data in a manner so that predictive model 5012, once sufficiently trained, is able to return predictions for the performance prediction specifying predicted performance data for a student user in dependence on candidate prompting profiles and skill level data for the student user. Thus, in response to query data that includes candidate prompting profile and skill level data, predictive model 5012 is able to predict performance data for the student user and therefore is able to select prompting profile from a set of candidate prompting profiles based on the one prompting profile being predicted to return the best performance data for the student user. Manager system 110 at block 1109 prior to sending prompting data associated to a new letter of a teaching session can query predictive model 5012 multiple times referencing different candidate prompting profiles to return a prediction as to the best performing prompting profile and can select the predicted best performing candidate prompting profile as the selected prompting profile selected for deployment.

With use of predictive model 5002, system 100 is able to adapt over time in different ways in dependence on recorded historical data for users of system 100, over the course of a plurality of teaching sessions. With use of the predict of predictive model 5002, as shown in FIG. 5A, manager system 110 is able to deploy a plurality of stroke maps that respectively define different stroke sequences for formation of an alphabet letter. Manager system 110, based on performance data associated to deployments of different stroke maps, is able to discern with use of predictive model 5002 the best performing stroke map for a letter out of a set of candidate stroke maps, wherein the best performing stroke map is the stroke map predicted to return the optimal performance data for a student user. System 100, accordingly, is able to adapt its operation based on historical data of a plurality of users so that system 100 provides prompting data to student users in ways that will optimally teach the student users.

With use of predictive model 5012, system 100 is able to adapt over time in different ways in dependence on recorded historical data for users of system 100, over the course of a plurality of teaching sessions. Manager system 110 according to one embodiment can deploy a plurality of prompting profiles and can apply performance data resulting from the different deployments as training data for training predictive model 5012 so that predictive model 5012 is configured for use in selecting a best performing prompting data. Manager system 110, based on performance data associated to deployments of different prompting profiles is able to discern with use of predictive model 5012 the best performing prompting profile out of a set of prompting profiles, wherein the predicted best performing prompting profile is the prompting profile predicted to return the optimal performance data for a student user. System 100, accordingly, is able to adapt its operation based on historical data of a plurality of users so that system 100 provides prompting data to student users in ways that will optimally teach the student users.

Various available tools, libraries, and/or services can be utilized for implementation of predictive model 5002 and/or predictive model 5012. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 5002 and/or predictive model 5012 can include use of e.g. support vector machines (SVM), Bayesian networks, neural networks and/or other machine learning technologies.

Education translates into job opportunities for economically challenged families and holds the promise to alleviate them from poverty. With the meagre means to sustain their livelihood, such families can ill-afford a formal education for their children, especially so in remote locations. Attempts at addressing the basic literacy gaps have been focused on building devices that are high on cost. Alternate methods such as classroom teaching are costly from a dependency standpoint when required for remote locations. Further, existing methods require end user intervention which increases room for error-prone learning. Also, existing methods rely on excessive communication which may become a burden to/demotivate the end-user.

Embodiments herein can provide audio messages instructing the user in following the outline elements and evaluates the same as well. A concluding audio message can identify an alphabet letter, instructs in its phonetic pronunciation, and provides a word-identification of the picture of the exemplary article, thereby enhancing the user's vocabulary.

Embodiments herein can commence a teaching session with presentment of the first letter of the alphabet which is displayed on the left screen and progresses to the subsequent letters based on progress achieved, automatically. This ensures that the child learns the alphabet exactly in the sequence required.

Embodiments herein can provide a visible indicator at the point that line needs to be stroked for formation of a letter and progressively moving the visible indicator in the correct direction to indicate the correct formation of a letter. The indicator can be e.g. a dot or arrow. The indicator can include a highlight, e.g. can be presented in flashing form, brightened form, or in a certain color. This visual cue works better since it is attractive to the child as it blinks and also does not require a level of audio comprehension for the child to understand instructions.

Embodiments herein can be configured to first ensure that a child speaks the letter correctly, and then, teaches the child to write in conjunction with speech.

Embodiments herein can be configured to only show the letter in the alphabet that needs to be read, outputs voice on how it should be spoken, accepts voice input from user, analyzes it, and provides feedback to a user. The proposed method can provide an interface to teach the user to write the same letter once spoken correctly.

Embodiments herein can focus on teaching the letters of the alphabet in spoken and written form and then extends this to words.

Embodiments herein can provide visual hints and voice based instructions to the end user towards learning letters of the alphabet. Embodiments can start with a) teaching the end user how to speak a letter, and b) can follow it up with teaching how to write the same letter accompanied with speech. One focus of the proposed solution is on vernacular languages in particular. One focus of the proposed solution is on enabling people living in remote areas, e.g., children and other student users to be able to read and write in their mother tongue (the primary language of communication) as well as other additional languages as required.

As part of a) the device initially displays a letter on the display-only screen and lends a voice indicating how to speak the letter. The voice input received from the user is analyzed for correctness. Once the input is correct, step b) is applied wherein the cursive path for the letter is demonstrated on the second (touch) screen and the user is prompted for input. The input received is analyzed and feedback provided. Once the user successfully completes the cursive writing of the letter, the same is repeated along with voice, until accuracy is obtained. The above can be extended to words once the basic alphabet has been successfully completed.

Embodiments herein can provide visual hints and voice based instructions to the end user towards learning letters of the alphabet. It starts with a) teaching the end user how to speak a letter, and b) follows it up with teaching how to write the same letter accompanied with speech. The device according to one embodiment can be shaped like a spiral bound book comprising 2 pages. Once opened, the dimension of the device may match the size of a A4 page.

The device (henceforth called 'main device') according to one embodiment can comprise the following: (A) 2 screens: 1 display-only screen, and another e-paper based touch screen. (B) a pair of magnetic clips which are affixed to the bottom of the screens in order to hold them together when the main device is in closed form, (C) a RASPBERRY® Pi® device with case attached to the back of the main device.

According to one embodiment, the device can run in first and second modes: I. Admin mode, II. Normal mode. The proposed method can include the device first run in admin mode. Once the main device is connected using Bluetooth/USB, it switches to admin mode. Following is a set of steps in admin mode: 1. Connect Bluetooth/USB. 2. Admin chooses the language. 3. Import/Load vocabulary for chosen language. 4. Load stroke map for chosen language. Each letter has a stroke map (sequence of strokes to be applied). 5. Load pronunciation for chosen language. 6. Load tones (cries) of a common set of animals. 7. Create profile (first time) for user. a. with user name, b. user input timeout, c. contact resume timeout. d. the name of the user's favorite animal (one among the preloaded options) of the user and persist in SD card. 8. Disconnect Bluetooth/USB.

The above steps can be achieved with the main device in closed position (and the device flipped over). 1. Open main device. 2. User hears welcome message including the user's name (as saved in step 6 of admin mode above). The message is spoken mimicking the tone of the user's favorite animal (as saved in step 6.d of admin mode above). 3. User sees the first letter on the left (display only) screen, 4. User hears a voice speaking the letter. 5. Main device waits for 5 seconds (user input timeout value which is configurable) for user input. If no voice input is received, then sequence repeats from step 3. 6. Once voice input is received, it is analyzed using software regarding the correctness of the pronunciation. 7. If pronunciation is incorrect, user sees a half smile on the left screen, and sequence repeats from step 3. 8. If pronunciation is correct, user sees a smile on the left screen, and a congratulatory message. The congratulatory message includes the user's name. 9. User hears a message that writing will now be taught. On the left screen, the letter is displayed again. 10. On the right touch screen, a dotted line representation is shown for the letter. The dotted line slowly converts into a bold line following the strokes for writing the letter. 11. Once the entire letter on the touch screen turns into bold, user hears the letter once again. 12. Now, the dotted line representation shows up again with a blinking dot at the start of the letter. Only the first stroke of the letter is shown. A voice prompts the user by name to write. 13. If the user fails to touch the screen up to 5 seconds (user input timeout value), steps 10 through 12 repeat. This continues until the user touches screen at the blinking dot. Once the first stroke is completed, the next stroke shows up in dotted line with a blinking dot at the start of the new stroke. This repeats for each stroke in sequence until all strokes are completed. 14. The user may complete moving the finger on the entire letter (finishing the entire dotted line). Lifting the finger and not resuming contact with the touch screen in 10 seconds (contact resume timeout value which is configurable) is indicative of attempt completion. 15. At this stage the attempt is compared against the original on 2 counts: a. the writing has to be complete. b. The strokes have to be applied exactly in the same sequence as expected (stroke map of the letter is compared). 16. The last known correct point on the dotted line is identified and the dot now blinks at that point with a blinking arrow indicating the direction to proceed, and a voice prompt to the user (including the user's name) to start again. Step 14 through 16 repeat until the comparison is a perfect match for 15. a. and b. 17. Once the writing is complete, only step 8 repeats. 18. Now a message is heard with the user name which indicates that writing and speaking have to be done together. The difference in this sequence is that at the end of writing the letter, user has to say the letter as well. 19. Once the writing and speaking together works fine, step 8 repeats. A message indicates that the user has now learnt the first letter, and congratulates the user by name. 20. Steps 3 through 19 repeat for subsequent letters automatically as per the sequence of letters in the alphabet. 21. If at any point the user closes the main device, the magnetic strips snap the device shut. At the same time, all the data associated with the user are persisted in the profile previously created by admin on the SD card. 22. The persisted data may include the following: a. User name b. Number of speech attempts for correct pronunciation. c. Number of writing attempts (i. Type of failure per writing attempt [incomplete/incorrect strokes]. ii. Time taken for completing each attempt). d. Number of writing-and-speech attempts (i. Type of failure per attempt [incomplete/incorrect strokes], ii. Time taken for completing each attempt, iii Time gap between writing completion and speech).

There can be 2 steps where comparisons are done: 1. Step 6 where the pronunciation in the voice of the user is compared against the original. This can be achieved using automatic pronunciation checker software. 2. Step 15 where the written output of the user is compared against the original. Image recognition software can be applied in order to achieve the same.

Certain embodiments herein may offer technical computing advantages involving computing advantages to address problems arising the realm of computer systems and computer networks. Embodiments herein can provide improved computer system operation in the realm of computer systems having user interface functionalities to provide teaching lessons to users. Embodiments herein can predict, with use of Artificial Intelligence (AI) processes, optimally performing prompting data and based on AI based action decisions can provide predicted optimally performing prompting data to users. Embodiments herein can store historical data for a plurality of users returned over a plurality of teaching sessions. Embodiments herein can use such historical data to return action decisions such as action decisions for the selection of one stroke map from a set of candidate stroke maps, wherein each candidate stroke map specifies a different set of stroke sequences for the formation of an alphabet letter. Embodiments herein can include use of a predictive model which can be trained using machine learning processes. Embodiments herein can include querying of a trained predictive model for return of predictions specifying the predicted performance of a student user in response to the student user receiving particular prompting data and with use of the described predictive model optimally performing prompting data can be selected for providing to a student user.

Figure 6:
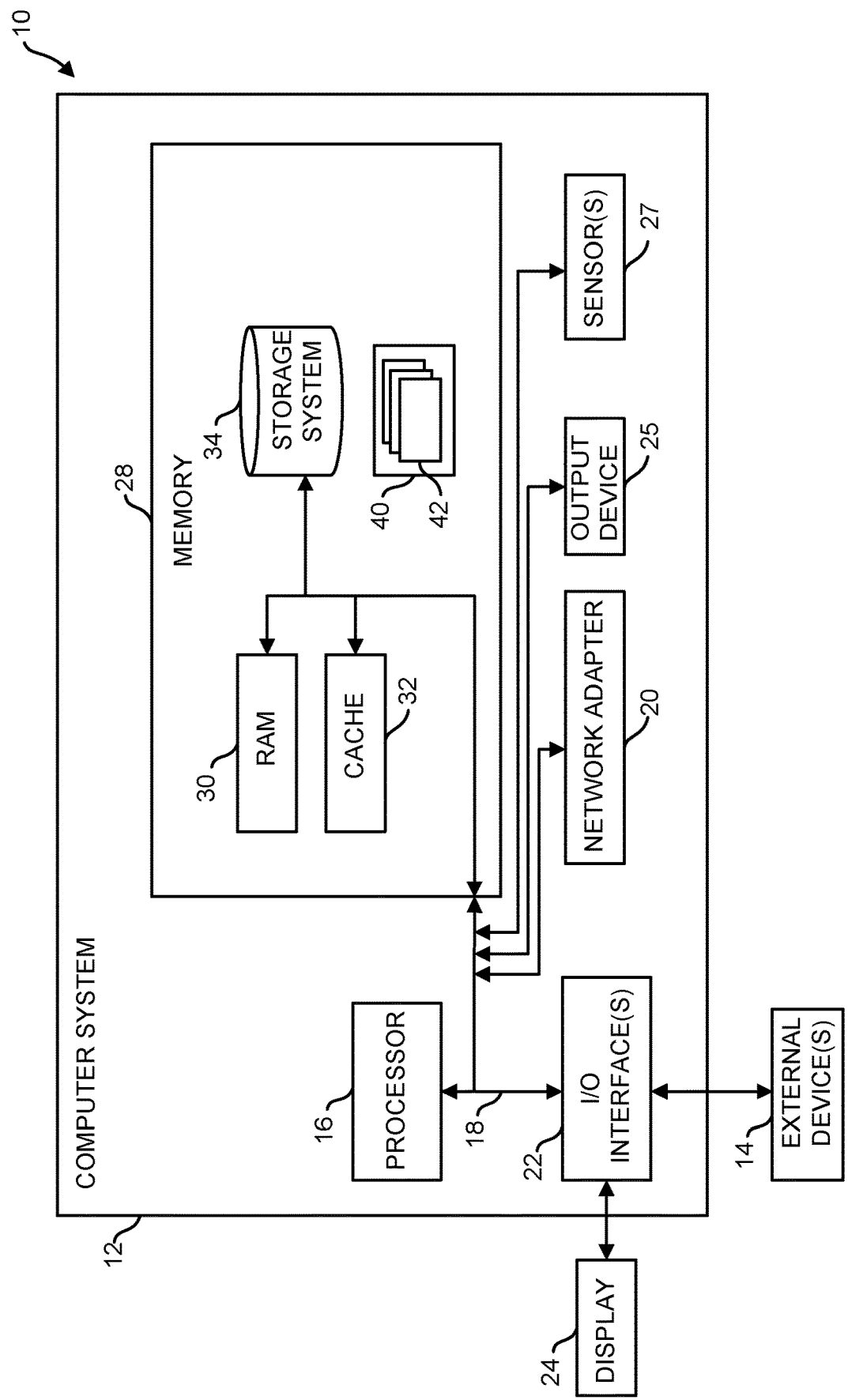
FIG. 6 depicts a computing node according to one embodiment.
Figure 7:
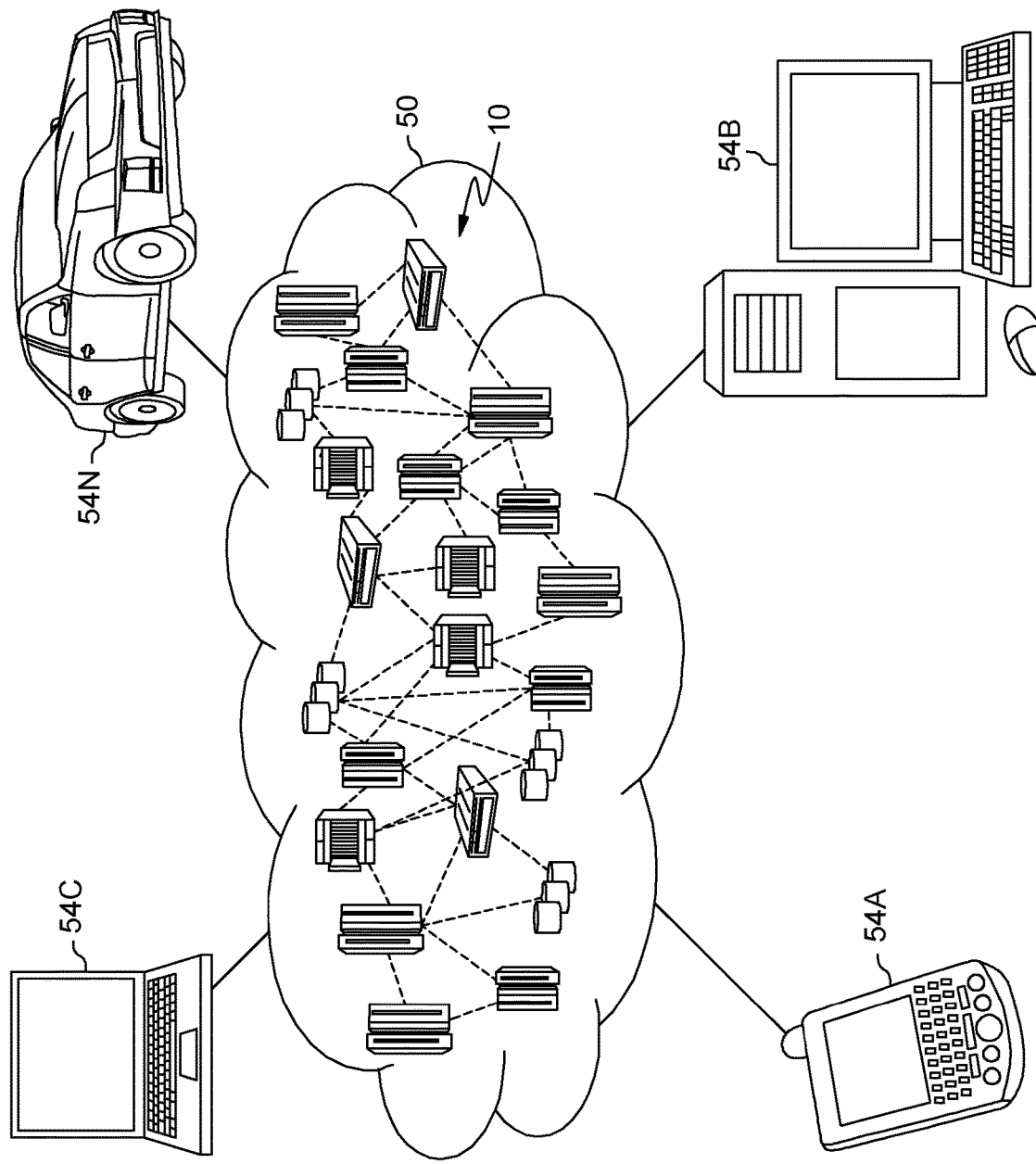
FIG. 7 depicts a cloud computing environment according to one embodiment.
Figure 8:
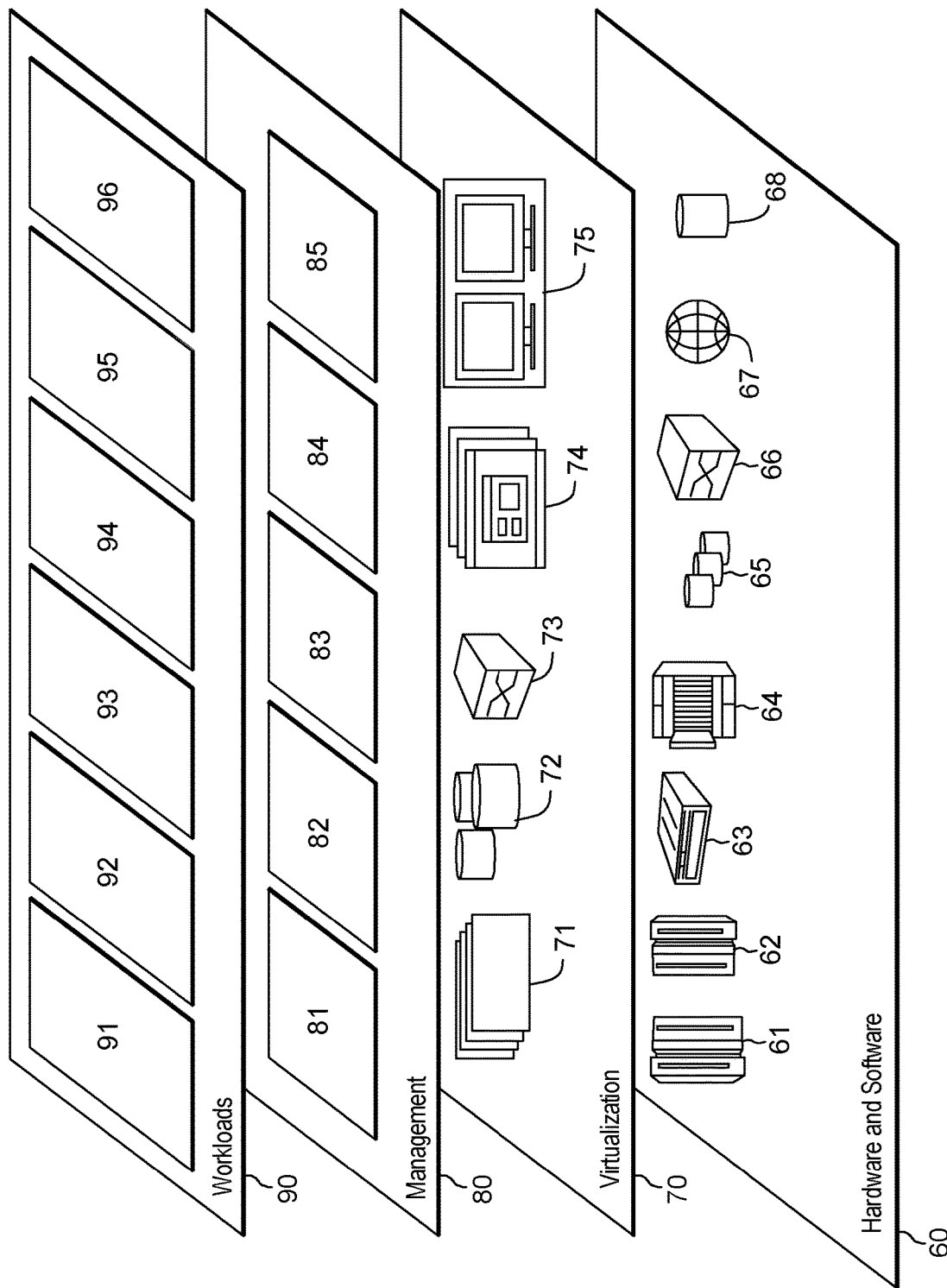
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIG. 3A. In one embodiment, one or more electronic teaching device 130A-130Z can include one or more computing node 10 and can include one or more program 40 for performing functions described with reference to electronic teaching device 130A-130Z as set forth in the flowchart of FIG. 3A. In one embodiment, systems 140, 150 can include one or more computing node 10 and can include one or more program 40 for performing functions described with reference to systems 140, 150 as set forth in the flowchart of FIG. 3A. In one embodiment, administrator client computer device 120 can include one or more computing node 10 and can include one or more program 40 for performing functions described with reference to administrator client computer device 125 as set forth in the flowchart of FIG. 3A. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include one or more output device 25 e.g. provided by a display or audio output device connected to bus 18. In one embodiment, output device 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for language teaching herein. The processing components 96 can be implemented with use of one or more program 40 described in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
providing to a student user prompting data, wherein the prompting data prompts the student user to enter into an electronic teaching device voice data defining a correct pronunciation for a certain alphabet letter of a language alphabet, and wherein the prompting data prompts the student user to electronically enter handwritten data into the electronic teaching device defining a correct drawing of the certain alphabet letter;
examining response data received from the student user in response to the prompting data; and based on the examining of the response data, providing to the student user next prompting data, wherein the providing prompting data includes providing prompting data so that a visible indicator displayed on display of the electronic teaching device viewed by the student user progressively moves responsively to the student user advancing the drawing of a letter line for the formation of the certain alphabet letter.

2. The computer implemented method of claim 1, wherein based on the examining indicating that the student user has correctly pronounced and drawn the certain alphabet letter, providing to the student user next prompting data, wherein the next prompting data prompts the student user to correctly pronounce a next alphabet letter, wherein the next prompting data prompts the student user to correctly draw the next alphabet letter, the next alphabet letter being different from the certain alphabet letter in the language alphabet.

3. The computer implemented method of claim 1, wherein the prompting data includes drawing prompting data for the certain alphabet letter that prompts for correct drawing of the certain alphabet letter, wherein method includes selecting the drawing prompting data from candidate drawing prompting data for the certain alphabet letter, wherein the selecting is in response to a query of a predictive model that predicts best performing drawing prompting data, wherein the predictive model has been training with use of training data obtained from historical teaching sessions, which historical teaching sessions includes historical teaching sessions associated to users other than the student user.

4. The computer implemented method of claim 1, wherein the prompting data includes drawing prompting data for the certain alphabet letter that prompts for correct drawing of the certain alphabet letter, wherein method includes selecting the drawing prompting data from candidate drawing prompting data for the certain alphabet letter, wherein the selecting is in dependence on historical data obtained from an historical teaching session.

5. The computer implemented method of claim 1, wherein the electronic teaching device is configured to be manually moved between a closed configuration and an open configuration, wherein the method includes automatically initiating a teaching session in response to a determination that the student user has manually moved the electronic teaching device into the open configuration.

6. The computer implemented method of claim 1, wherein the method includes determining a skill level of the student user in dependence on the examining of the response data and selecting a certain stroke map out of a set of candidate stroke maps for use in generating the next prompting data, wherein the selecting a certain stroke map is in dependence on the skill level.

7. The computer implemented method of claim 1, wherein the method includes selecting the prompting data from candidate prompting data, wherein the selecting is in dependence on historical data obtained from an historical teaching session.

8. The computer implemented method of claim 1, wherein the method includes determining a skill level of the student user in dependence on the examining of the response data and generating the next prompting data in dependence on the skill level.

9. The computer implemented method of claim 1, wherein the method includes selecting the prompting data from candidate prompting data, wherein the selecting is in dependence on historical data obtained from an historical teaching session, wherein the method includes determining a skill level of the student user in dependence on the examining of the response data and generating the next prompting data in dependence on the skill level.

10. A computer implemented method comprising:
providing to a student user prompting data, wherein the prompting data prompts the student user to enter into an electronic teaching device voice data defining a correct pronunciation for a certain alphabet letter of a language alphabet, and wherein the prompting data prompts the student user to electronically enter handwritten data into the electronic teaching device defining a correct drawing of the certain alphabet letter;
examining response data received from the student user in response to the prompting data; and based on the examining of the response data, providing to the student user next prompting data, wherein the method includes selecting the prompting data from candidate prompting data, wherein the selecting is in dependence on historical data obtained from an historical teaching session.

11. The computer implemented method of claim 10, wherein based on the examining indicating that the student user has correctly pronounced and drawn the certain alphabet letter, providing to the student user next prompting data, wherein the next prompting data prompts the student user to correctly pronounce a next alphabet letter, wherein the next prompting data prompts the student user to correctly draw the next alphabet letter, the next alphabet letter being different from the certain alphabet letter in the language alphabet.

12. The computer implemented method of claim 10, wherein the prompting data includes drawing prompting data for the certain alphabet letter that prompts for correct drawing of the certain alphabet letter, wherein method includes selecting the drawing prompting data from candidate drawing prompting data for the certain alphabet letter, wherein the selecting is in response to a query of a predictive model that predicts best performing drawing prompting data, wherein the predictive model has been training with use of training data obtained from historical teaching sessions, which historical teaching sessions includes historical teaching sessions associated to users other than the student user.

13. The computer implemented method of claim 10, wherein the prompting data includes drawing prompting data for the certain alphabet letter that prompts for correct drawing of the certain alphabet letter, wherein method includes selecting the drawing prompting data from candidate drawing prompting data for the certain alphabet letter, wherein the selecting is in dependence on historical data obtained from an historical teaching session.

14. The computer implemented method of claim 10, wherein the method includes determining a skill level of the student user in dependence on the examining of the response data and generating the next prompting data in dependence on the skill level.

15. The computer implemented method of claim 10, wherein the method includes selecting the prompting data from candidate prompting data, wherein the selecting is in dependence on historical data obtained from an historical teaching session, wherein the method includes determining a skill level of the student user in dependence on the examining of the response data and generating the next prompting data in dependence on the skill level.

16. The computer implemented method of claim 10, wherein the method includes selecting the prompting data from candidate prompting data, wherein the selecting is in dependence on historical data obtained from an historical teaching session, wherein the method includes determining a skill level of the student user in dependence on the examining of the response data and generating the next prompting data in dependence on the skill level, wherein the providing prompting data includes providing prompting data so that a visible indicator displayed on display of the electronic teaching device viewed by the student user progressively moves responsively to the student user advancing the drawing of a letter line for the formation of the certain alphabet letter.

17. A computer implemented method comprising:
providing to a student user prompting data, wherein the prompting data prompts the student user to enter into an electronic teaching device voice data defining a correct pronunciation for a certain alphabet letter of a language alphabet, and wherein the prompting data prompts the student user to electronically enter handwritten data into the electronic teaching device defining a correct drawing of the certain alphabet letter;
examining response data received from the student user in response to the prompting data; and based on the examining of the response data, providing to the student user next prompting data, wherein the method includes determining a skill level of the student user in dependence on the examining of the response data and generating the next prompting data in dependence on the skill level.

18. The computer implemented method of claim 17, wherein based on the examining indicating that the student user has correctly pronounced and drawn the certain alphabet letter, providing to the student user next prompting data, wherein the next prompting data prompts the student user to correctly pronounce a next alphabet letter, wherein the next prompting data prompts the student user to correctly draw the next alphabet letter, the next alphabet letter being different from the certain alphabet letter in the language alphabet.

19. The computer implemented method of claim 17, wherein the method includes determining a skill level of the student user in dependence on the examining of the response data and selecting a certain stroke map out of a set of candidate stroke maps for use in generating the next prompting data, wherein the selecting a certain stroke map is in dependence on the skill level.

20. The computer implemented method of claim 17, the method includes selecting the prompting data from candidate prompting data, wherein the selecting is in dependence on historical data obtained from an historical teaching session.

* * * * *